US010544922B2

(12) United States Patent
Lee

(10) Patent No.: US 10,544,922 B2
(45) Date of Patent: Jan. 28, 2020

(54) REFLECTOR LAMP WITH PUSH-PUSH ADJUSTMENT ASSEMBLY FOR VARYING A LIGHT BEAM ANGLE THEREOF

(71) Applicant: MASS TECHNOLOGY (H.K.) LIMITED, Kwun Tong, Kowloon (HK)

(72) Inventor: Wing Tak Lee, Kowloon (HK)

(73) Assignee: NEONLITE DISTRIBUTION LIMITED, Kowloon (HK)

( * ) Notice: Subject to any disclaimer, the term of this patent is extended or adjusted under 35 U.S.C. 154(b) by 49 days.

(21) Appl. No.: 15/995,253

(22) Filed: Jun. 1, 2018

(65) Prior Publication Data
US 2019/0242554 A1    Aug. 8, 2019

Related U.S. Application Data

(60) Provisional application No. 62/626,475, filed on Feb. 5, 2018.

(30) Foreign Application Priority Data

May 4, 2018    (EP) .................................... 18275063

(51) Int. Cl.
| F21V 14/04 | (2006.01) |
| F21V 14/02 | (2006.01) |
| F21S 41/675 | (2018.01) |
| F21V 7/16 | (2006.01) |

(52) U.S. Cl.
CPC ............ *F21V 14/04* (2013.01); *F21S 41/675* (2018.01); *F21V 7/16* (2013.01); *F21V 14/02* (2013.01)

(58) Field of Classification Search
CPC .. F21V 7/16; F21V 14/02; F21V 14/04; F21S 41/475
See application file for complete search history.

(56) References Cited

U.S. PATENT DOCUMENTS 5,758,943 A * 6/1998 Shirai .................. B60Q 1/0686
                                                        33/288
2010/0195336 A1* 8/2010 Hashemi ................. F21V 14/00
                                                        362/324

* cited by examiner

*Primary Examiner* — Anh T Mai
*Assistant Examiner* — Nathaniel J Lee
(74) *Attorney, Agent, or Firm* — Browdy and Neimark, P.L.L.C.

(57) ABSTRACT

The invention provides a reflector lamp comprising a light source, a lens and/or a reflector arranged coaxially with the light source in a spaced-apart fashion, and a push-push adjustment assembly for varying a beam angle of the light beam in a push manner. The push-push adjustment assembly comprises a frame coupled fixedly to the lamp, an actuator in operative connection with the lens or the reflector, wherein the actuator movably rests in the frame so that the movement of the actuator enables the lens or the reflector to slide relative to the light source thereby to provide variable axial spacing between the lens or the reflector and the light source, and a push-push latch mechanism coupled to the actuator and/or the frame to move the actuator in the frame.

22 Claims, 20 Drawing Sheets

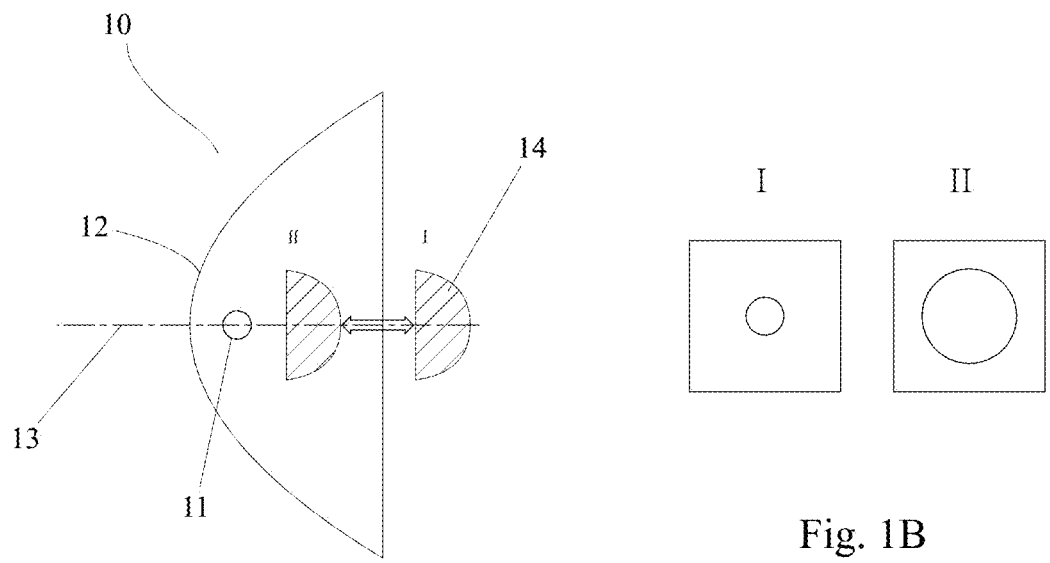
Fig. 1A
Fig. 1B
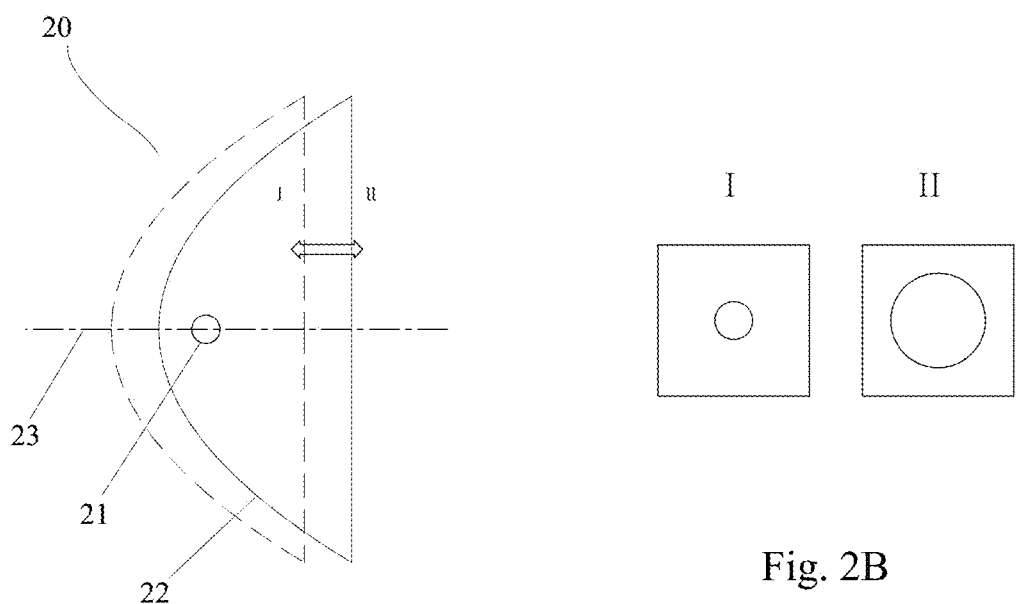
Fig. 2A
Fig. 2B

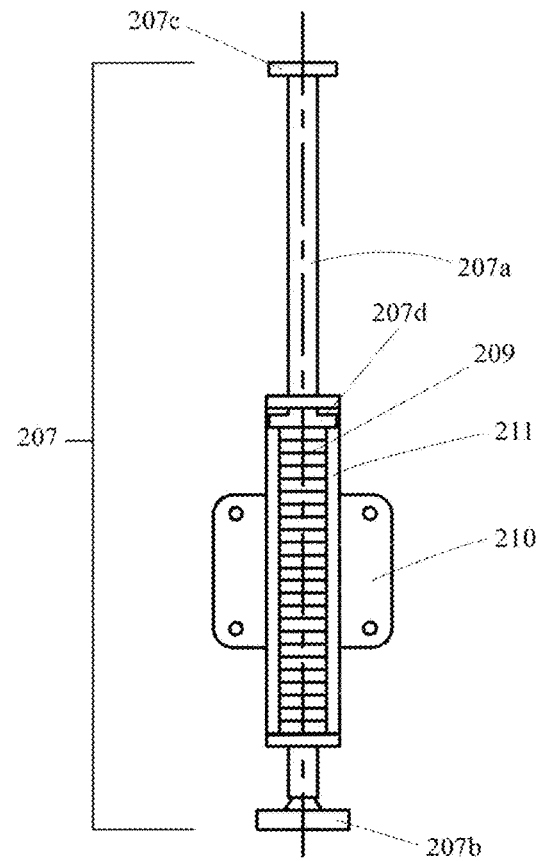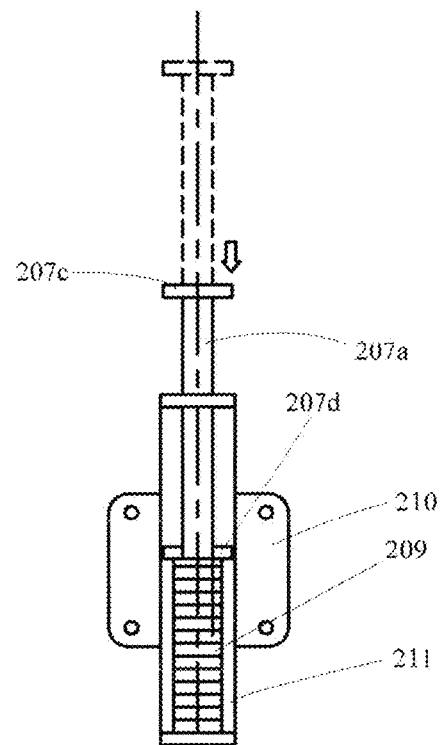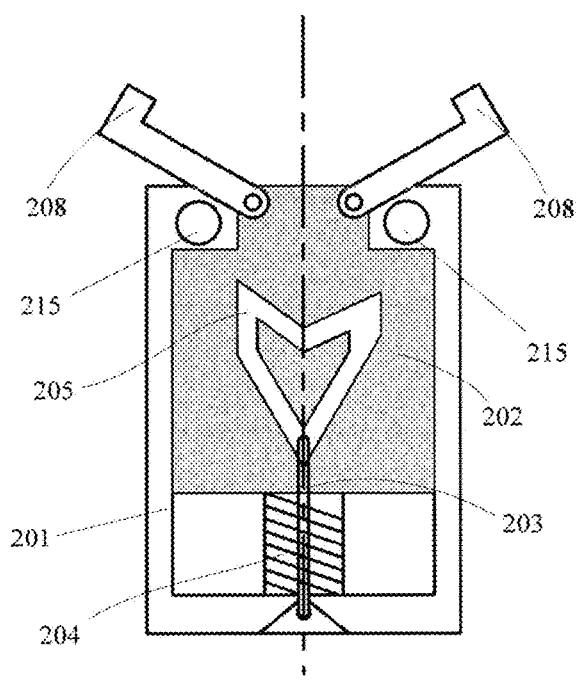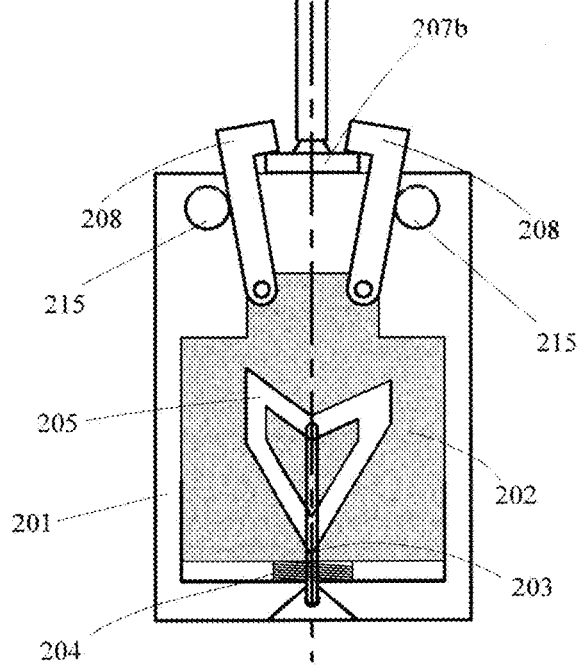
Fig. 6C
Fig. 6D

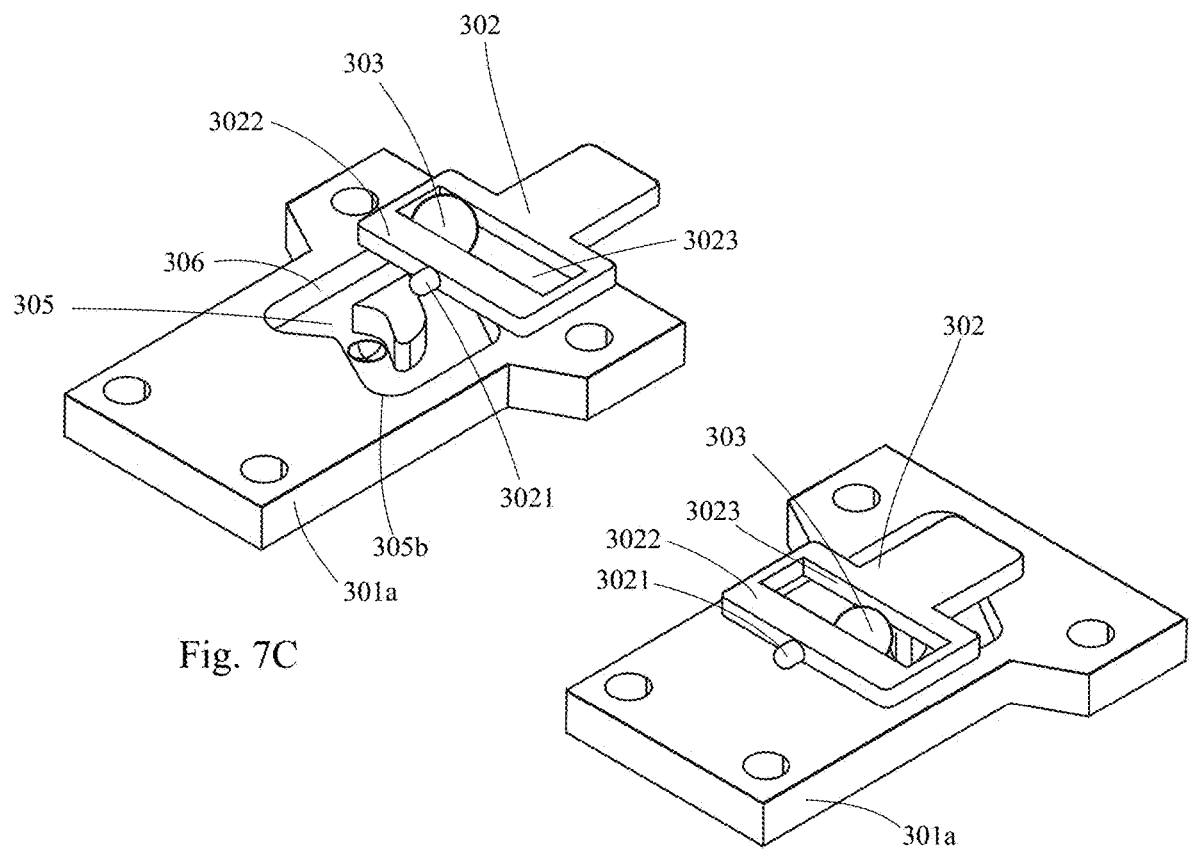
Fig. 7C
Fig. 7D
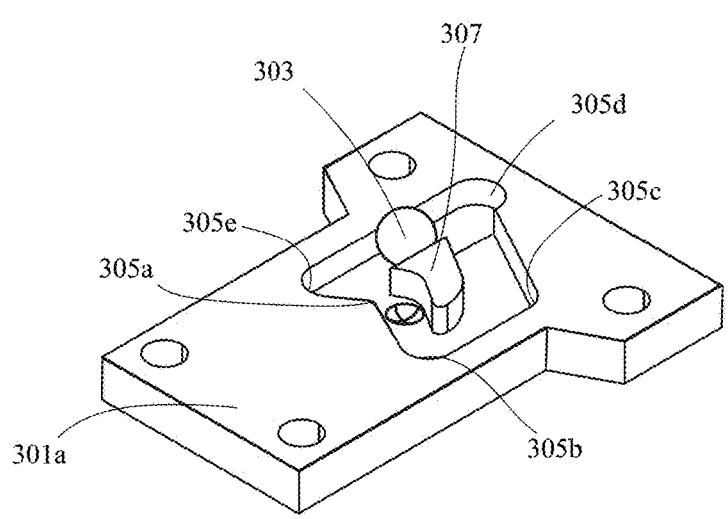
Fig. 7E

B-B

REFLECTOR LAMP WITH PUSH-PUSH ADJUSTMENT ASSEMBLY FOR VARYING A LIGHT BEAM ANGLE THEREOF

FIELD OF THE INVENTION

The present invention is generally in the field of lighting fixtures. More specifically, the present invention concerns a reflector lamp which comprises a push-push adjustment assembly for varying a light beam angle of the reflector lamp, providing an ease of adjusting the light beam angle hence the lighting pattern.

BACKGROUND OF THE INVENTION

LED reflector lamps become more and more popular in a wide range of lighting applications. Typically a LED reflector lamp is an arrangement of a LED light source, heat sink, driver electronics, and most importantly a lens or reflector is being used to collect lights from the light source and direct them to form an illumination pattern defined mainly by the illumination beam angle it was designed for.

Current LED reflector lamps include spotlights and floodlights. Generally reflector lamps are classified as follows on the basis of the beam angle:

Spotlights: 4-19 degrees,
Floodlights: 20-35 degrees
Wide Floodlights: 36-49 degrees
Very Wide Floodlights: 50-120 degrees or more Professional applications demand more tightened control of beam angles, for example to be set specifically at 8 degree, 24 degree, 36 degree, and 60 degree.

However it is often required to change the illumination area and the beam angles in many occasions such as retail stores or performance stages. For instance, it is necessary to carry inventory of all the different beam angles versions of the same reflector lamp in order to satisfy various application requirements of the user's, which results in a large inventory in stock and affects cash flow. In other cases, when the users want to change the lighting pattern utilizing lamp with a different illumination angle, they would either need to change out the existing lamps, or to change the lenses or the reflector kits with new replacements, which incur a lot of money, time and labor.

In the early days of stage lighting, the light sources were mainly incandescent, and the beam angle for the spotlights is changed by changing the relative distance between two or more lenses in front of the light source installed on a fixed reflector cup. U.S. Pat. No. 6,092,914 teaches such a design with two sets of lenses and a sliding beam angle adjustment mechanism using a rotating dial knob installed on the side of the lens assembly. Similar design can also be found in US patent application no. US2012/0287621A1 using LEDs as a light source.

Another design useful in torch lights for this purpose is to utilize an adjustment mechanism that allows a user to turn the lens assembly around its longitudinal axis. The grooves inside the lens assembly would then push the lens assembly further away from, or pull the lens assembly closer to the light source, hence the illumination angle of the torch light is being adjusted, which is taught, for example, in U.S. Pat. No. 7,261,438.

Apart from using the lens assemblies to effect the change of illumination beam angles, the use of multiple reflector assemblies could also achieve similar effects. US patent application no. US2010/0149820A1 teaches how the LED light beam angle is changed by extending or retracting the linear positions of a three section reflector assembly.

In some cases for a small change of the beam angle, it is only needed to move a single reflector toward or away from the light source along the reflector's central axis against its focal point. Adjusting the position of a lens, for example TIR (Total Internal Reflection) lens or Fresnel lens, towards and away in front of a LED light source, and along its central axis can also achieve the same results.

Push switches are well known in the mechanical field, which comprise an actuator mounted for reciprocal movement among alternate positions in a "push to change" manner. For example, U.S. Pat. No. 4,001,526A describes an "alternate action switch". A variant of the push switch is designed as a "push latch" described in U.S. Pat. No. 5,984,381.

There is a need for adjusting reflector lamp conveniently to generate a light beam with variable beam angles.

SUMMARY OF THE INVENTION

An object of the invention is to provide a novel reflector lamp which comprises an adjustment mechanism for varying the beam angle of the light beam. The adjustment mechanism is arranged such that the user simply pushes at the front of the lamp to select the desirable beam angle. In elevated installation locations, the user can make use of a long stick to push the lamp instead of climbing a ladder, with an advantage of saving time and labor.

The above object can be attained by providing a reflector lamp comprising:

a light source for generating a light beam, a reflector having a reflective inner surface to define a cavity, and an opening formed by an edge of the reflective inner surface, wherein the light source is disposed in the cavity, and a lens arranged coaxially with and being spaced apart from the light source, characterized in that the reflector lamp further comprises a push-push adjustment assembly for varying a beam angle of the light beam in a push manner, the push-push adjustment assembly comprising;

a frame coupled fixedly to the lamp;

an actuator in operative connection with the lens or the reflector, wherein the actuator movably rests in the frame so that the movement of the actuator enables the lens or the reflector to slide relative to the light source thereby to provide variable axial spacing between the lens or the reflector and the light source; and a push-push latch mechanism coupled to the actuator and/or the frame to move and to latch the actuator in the frame.

In one preferred embodiment of the invention, the push-push adjustment assembly may be provided as a cam track and latch pin assembly, comprising:

the frame, the actuator, preferably coupled with the lens or the reflector, configured as a slider slidably disposed in the frame wherein a cam track defined in the slider, the push-push latch mechanism configured as a pin member, wherein the pin member has a first end connected to the frame and a second end selectably engageable with the cam track in the slider to cause the slider to alternate among a plurality of resting positions in the frame in response to alternating application and removal of a pushing force on the slider, and a resilient member acting on the slider to urge the slider in a direction opposite to the pushing force.

Preferably, the cam track comprises a closed course defined by a plurality of track sections having a plurality of differences in groove depth in order to guide movement of the pin member in the closed course in accordance with a predetermined unidirectional path. The pin member follows the closed course to move and be latched in a plurality of locked positions, so that the plurality of locked positions are respectively correspondent to the plurality of resting positions of the slider in the frame.

In a particular embodiment of the invention, the cam track and latch pin assembly further comprises at least one plunger arranged above the slider, and at least one pair of opposed pivotable catches in a number corresponding to the number of plunger, wherein the pair of the pivotable catches are rotatably disposed on the slider and under the constrain of a pair of stopper pins on the frame to close and to capture the plunger, and to open and release the plunger in response to alternating application and removal of a pushing force on the plunger. In order to provide a longer travel distance for the plunger, the plunger may comprise a housing fixed on the lamp, a spring barrel mounted on the housing, a spring member received in the spring barrel, wherein a first portion of the plunger has a top button protruding beyond the spring barrel and is terminated at one end of the spring member, and a second portion of the plunger extends out of the spring barrel and is capturable by the pair of pivotable catches In some cases, the cam track and latch pin assembly may comprise two or more plungers which are different in plunger length and are installed in their corresponding cam track and latch pin assemblies, and a corresponding number of the catch pairs, each of the catch pairs is positioned to capture a respective one of the plungers, thereby enabling the selection of more than two axial spacings between the lens or the reflector that is attached to the plungers and the light source.

In a further preferred embodiment of the invention, the push-push adjustment assembly may be provided as a cam track and latch trackball assembly, comprising;

the frame having an inner surface, wherein a cam track is defined on the inner surface of the frame, the actuator, preferably coupled with the lens or the reflector, configured as a slider slidably disposed in the frame, the slider comprising a lateral element and a stub extending downward from the lateral element, wherein a lateral slot hole is defined on the lateral element, the push-push latch mechanism configured as a trackball, wherein the trackball is received movably in the lateral slot hole of the slider and moves to selectably engage the cam track in the frame to cause the slider to alternate among a plurality of resting positions in the frame in response to alternating application and removal of a pushing force on the lateral element of the slider, and a resilient member acting on the stub of the slider to urge the slider in a direction opposite to the pushing force.

Similarly, the cam track of the further preferred embodiment comprises a closed course defined by a plurality of track sections having a plurality of differences in groove depth in order to guide movement of the trackball in the closed course in accordance with a predetermined unidirectional path. The trackball constrained by the lateral slot hole is movable in the closed course to be latched in a plurality of locked positions, so that the plurality of locked positions are respectively correspondent to the plurality of resting positions of the slider in the frame.

In a yet preferred embodiment of the invention, the push-push adjustment assembly may be provided as a cam track and pivotable arm assembly, comprising;

the frame, wherein a cam track is defined in the frame and a sliding ramp is formed above the cam track, the sliding ramp having a lower end whose end surface terminates in the cam track and an upper end whose end surfaces bridges with the cam track, the actuator, preferably coupled with the lens or the reflector, configured as a slider slidably disposed in the frame, the slider comprising a lateral element and a base post extending downward from the lateral element, wherein a longitudinal cavity is defined in the base post, the push-push latch mechanism configured as a pivotable arm having a pivot end pivotablely mounted on the lateral element, and a free end at which a latching pin is mounted, wherein the pivot end is loaded with a spring member that exerts a biasing force such that the pivotable arm has a tendency of resting on the upper end of the sliding ramp of the frame, and the pivotable arm is pivotablely received in the cavity of the base post and pivots to selectably engage the cam track in the frame to cause the slider to alternate among a plurality of resting positions in the frame in response to alternating application and removal of a pushing force on the lateral element of the slider, and a resilient member acting on the base post of the slider to urge the slider in a direction opposite to the pushing force.

Preferably, the latching pin at the free end of the pivotable arm travels along the sliding ramp of the frame to drop into the cam track, and moves to engage in the cam track to be latched in a plurality of locked positions, so that the plurality of locked positions are respectively correspondent to the plurality of resting positions of the slider in the frame. The cam track of this yet embodiment is designed such that the latching pin at the free end of the pivotable arm is movable in the cam track to be latched in a latch position where the slider is in a retracted position and movable to be latched in the upper end of the sliding ramp where the slider is in an extended position.

According to the invention, the frame of the push-push adjustment assembly may be fastened to a bottom of the reflector or to a part of a heat sink of the reflector lamp.

The reflector lamp of the invention includes a special push-push adjustment assembly coupled to the reflector or the lens that is positioned in the front of the light source. Direct or indirect application of a pushing force onto the lens or the reflector at the front of the reflector lamp may vary and latch the relative positions of the lens or the reflector and the light source. As a result, the beam angle of the resultant light beams from the reflector lamp is being changed. When the lens or the reflector is being pushed toward the lamp body once again, the beam angle for instance would resume to the previous beam angle.

The objects, characteristics, advantages and technical effects of the invention will be further elaborated in the following description of the concepts and structures of the invention with reference to the accompanying drawings.

BRIEF DESCRIPTION OF THE DRAWINGS

FIGS. 1A and 1B illustrate control of a light beam angle by moving a lens in front of the light source along an axial center line of the reflector lamp available in the prior art, wherein positions of the light source and the reflector are stationary and fixed.

FIGS. 2A and 2B illustrate control of a light beam angle by moving the reflector cup along an axial center line of the light source of the reflector lamp available in the prior art, wherein position of the light source is stationary and fixed.

FIGS. 6C and 6D illustrate a variant of the push-push adjustment assembly shown in FIGS. 6A and 6B.

FIGS. 7C and 7D are perspective views of the push-push adjustment assembly shown in FIG. 7A, with the back housing member being removed and the slider resting in the extended and retracted positions respectively.

FIG. 7E is a perspective view of the push-push adjustment assembly shown in FIG. 7A, with the back housing member and the slider being removed.

DETAILED DESCRIPTION OF THE INVENTION

Figure 3:
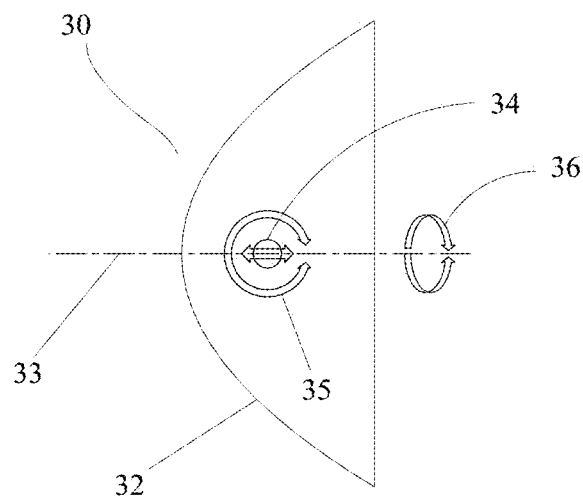
FIG. 3 illustrates control of a light beam angle by adjusting the lens and/or reflector cups in different ways to change a light beam angle of the reflector lamp available in the prior art.

While this invention is illustrated and described in preferred embodiments, reflector lamps with the push-push adjustment assembly may be produced in many different configurations, sizes, forms and materials.

Referring now to the drawings, FIGS. 1A to 3 illustrate different methods known in the art to vary the light beam angle of a reflector lamp, with a result of changing the size of the resultant light spot on a target in the illumination area.

FIG. 1A shows a reflector lamp 10 comprises a light source 11, a reflector cup 12 and a converging lens 14 installed at a narrow beam angle position (I) along an axial center line 13 of the reflector cup 12. The size of the light spot casted by the lamp on the target is shown as I in FIG. 1B. The light spot size on the same target can be increased (II in FIG. 1B) if the lens is moved along the axial center line 13 towards the light source, to the wide beam angle position (II). The positions of the reflector cup 12 and the light source 11 remain stationary and fixed.

Similarly FIG. 2A shows a reflector lamp 20 comprises a light source 21 and a reflector cup 22. When the reflector cup 22 is at the narrow beam position (I), the size of the light spot casted by the lamp on the target is shown as I in FIG. 2B. The light spot size on the same target can be increased if the reflector cup 22 is moved along an axial center line 23 towards the light source 21 to the wide beam angle position (II). The position of the light source 21 remains stationary and fixed.

There are different ways proposed in the prior arts to effect the change of the relative position of the lens or the reflector to the light source in order to adjust the illumination beam angle of the lamp. FIG. 3 shows a reflector lamp 30 with a reflector cup 32, and a knob 34. The light source (not shown) is fixed inside the reflector. The common ways of adjusting the beam angle include:

I) sliding the knob 34 on the lamp toward the front and back of the lamp,

II) turning the knob 34 in a clockwise or counterclockwise direction 35, and

III) turning the lens or reflector 32 about a center axis 33 of the lens in a rotational manner 36.

Figure 4:
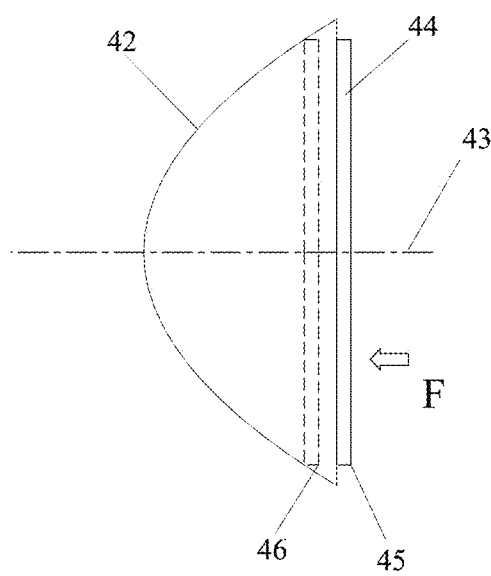
FIG. 4 is a schematic diagram showing a pushing force is applied to re-position the lens relative to the light source according to the present invention.

The present invention provides a new method of varying the beam angle of the reflector lamp. FIG. 4 illustrates the concept of the invention to re-position the lens relative to the light source. In particular, the reflector lamp comprises reflector cup 42, a light source (not shown) that is fixed inside the lamp, and a lens assembly 44. As illustrated, the lens assembly 44 is originally set to a first position (or extended position) 45. Application of a pushing force F can lead to the lens assembly 44 being latched automatically at a second (or retracted) position 46 to provide a different beam angle of the reflector lamp. The lens assembly 44 can return and be latched at the first position 45 when the lens assembly 44 is being pushed again to resume the original beam angle.

Figure 5A:
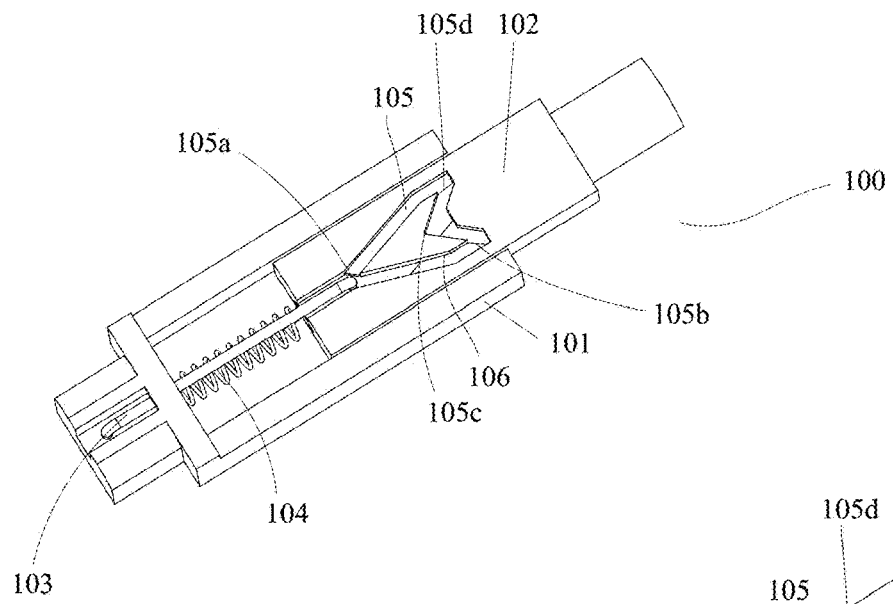
FIGS. 5A and 5B illustrate a push-push adjustment assembly useful in a LED reflector lamp constructed consistent with a first embodiment of the invention, the push-push adjustment assembly is in extended and retracted position respectively.
Figure 5B:
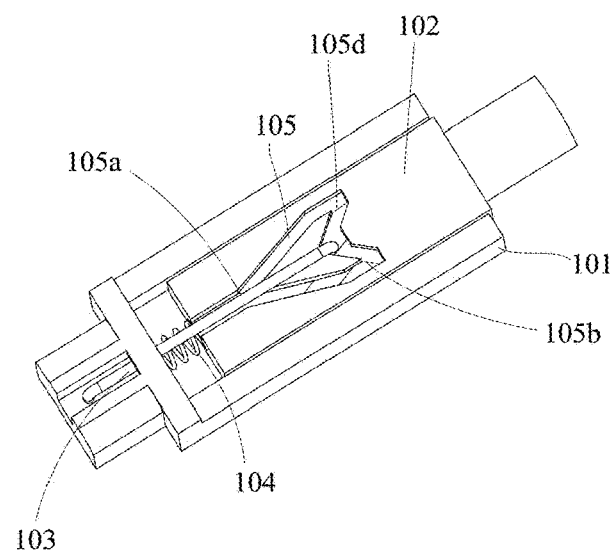
Figure 5C:
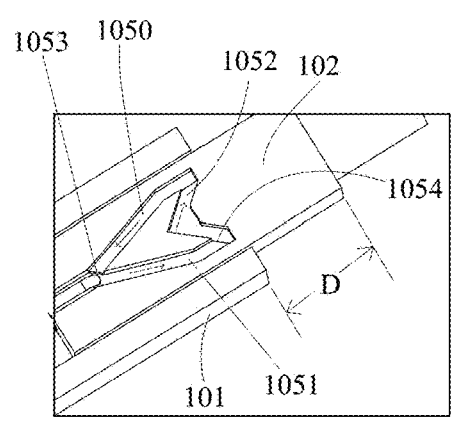
FIGS. 5C and 5D are schematic diagrams of enlarged the cam track of the push-push adjustment assembly shown in FIGS. 5A and 5B.

FIGS. 5A to 5J provide a push-push adjustment assembly 100 constructed consistent with a first preferred embodiment of the present invention. In this embodiment as shown in FIG. 5A, the push-push adjustment assembly 100 includes a frame 101 and a slider 102 slidably disposed in the frame 101. The slider 102 slides linearly with respect to the frame 101 in a way similar to a piston moving inside a reciprocation engine. A resilient member 104 acts on the slider 102 to urge the slider 102 outwardly to an extended position. The resilient member 104 may be a helical compression spring.

A cam track 105 is defined on the slider 102 and retains the slider 102 in the correct preset positions during different phases of operating the adjustment assembly 100. A pin member 103 has a first end anchored onto an appropriate location at the closed end of the frame 101 and a second end (also called "sliding end") which slidably and selectably engage a closed course 106 in the cam track 105 to cause the slider 102 to alternate between a retracted position and an extended position in response to alternating application and removal of a pushing force on an outer end face of the slider 102, which will be elaborated herein below. The pin member 103 may be made of a wire form spring type of material, and the near-middle section of the pin member 103 is compressed downward such that the sliding end (i.e. second end) of the pin member 103 is always pressed down and stays inside the closed course 106 of the cam track 105.

Figure 5D:
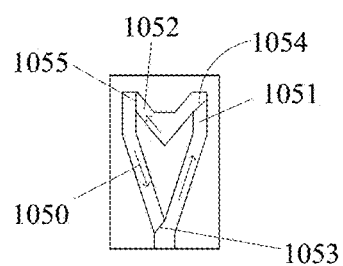

The cam track 105 is in heart-shaped and the closed course 106 of the cam track 105 is formed by different track sections which are different from one another in groove depth in order to guide the sliding end of the pin member 103 in anticlockwise direction. As best seen in FIG. 5D, the cam track 105 comprises upward ramps 1050, 1051 and 1052 followed by downward step walls 1053, 1054 and 1055. The remaining parts of the cam track are flat and smooth.

Figure 5E:
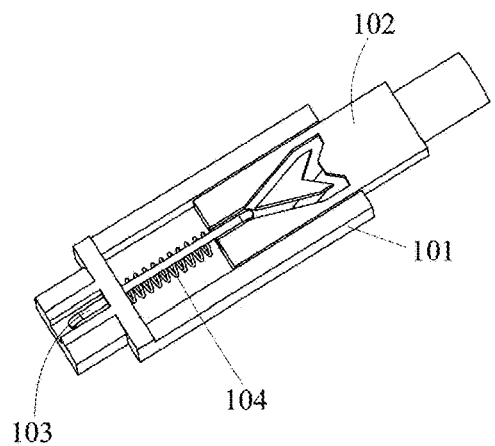
FIGS. 5E to 5J are schematic views showing the movement of the slider of the push-push adjustment assembly shown in FIGS. 5A to 5D between the extended position and the retracted position.
Figure 5F:
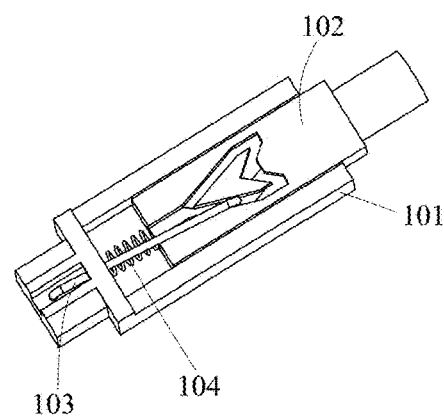
Figure 5G:
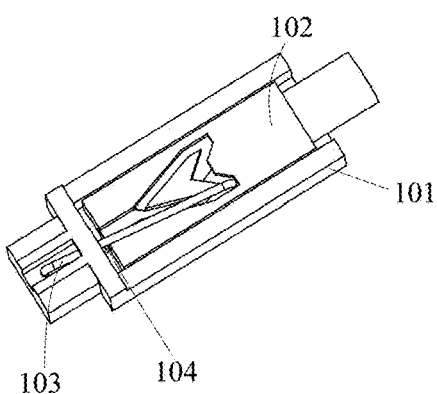
Figure 5H:
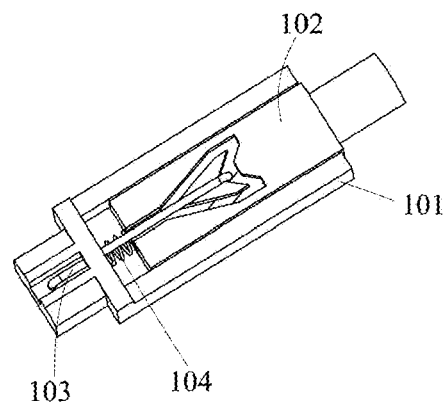

The operation of the adjustment assembly 100 will be depicted with reference to FIGS. 5E to 5J. FIG. 5E shows the pin member 103 is in a first latched position 105a where the slider 102 is in an extended position. When a pushing force is applied by a user on the outer end face of the slider 102 to push the slider moving inwards, the sliding end of pin member 103 leaves its first latched position 105a and travels along the cam track 105 (FIG. 5F) towards the first end position 105b (FIG. 5G) and stops where the user cannot push the slider any further and the pushing force is removed. The slider 102 would then spring back out of the frame 101 by reaction of the resilient member 104 and the cam track 105 guides the sliding end of pin member 103 to the second latched position 105c and stops here automatically (FIG. 5H). The second latched position 105c corresponds to a retracted position of the slider 102.

The slider 102 travelled a distance "D" which is equivalent to the distance between the first and second latched positions 105a and 105c of the pin member 103. In the present invention, the slider 102 is terminated with the lens or the reflector of a reflector lamp, the reflector lamp would be able to provide two preset beam angle settings in the extended and retracted positions of the slider 102.

Figure 5I:
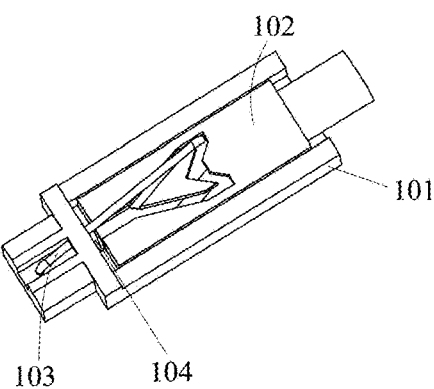
Figure 5J:
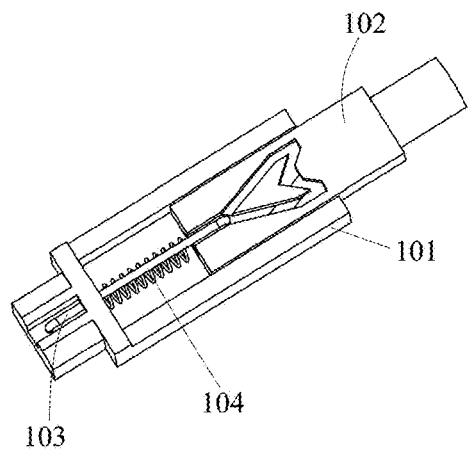

When the user wishes to reset the slider 102 from the retracted position (FIG. 5H) to the extended position (FIGS. 5E and 5J), he just needs to push the slider 102 by applying the pushing force on the slider 102 towards the frame 101. The cam track 105 would guide the sliding end of pin member 103 to the second end position 105d (FIG. 5I). The user feels that the slider cannot be pushed any further and the pushing force is removed. The slider 102 would then spring back out of the frame 101 by reaction of the resilient member 104 and the cam track 105 guides the sliding end of pin member 103 to the first latched position 105a and stops automatically (FIG. 5J). The slider 102 resumes to the extended position.

As discussed above, the cam track 105 comprises upward ramps 1050, 1051 and 1052 followed by downward step walls 1053, 1054 and 1055, which guide the pin member 103 to travel in the unidirectional manner. When the slider 102 in the extended position (FIG. 5E) is being pushed, the sliding end of pin member 103 travels from the first latching position 105a in the anticlockwise direction up onto the ramp 1051, and then suddenly falls onto the step wall 1054 and stop at the first end position 105b (FIG. 5G). When the user releases the pushing force, the sliding end of pin member 103 cannot go back to the first latching position 105a because it is being constrained by the step wall 1054, but can only advances to the second latched position 105c (FIG. 5H) where the slider 102 is in the retracted position. Since the second latched position 105c is off center to the pin member 103, there is a biasing force to the pin member 103 directing it toward the ramp 1052. When the user presses the slider 102 again to release the slider 102 from the retracted position, the sliding end of pin member 103 would leave the second latched position 105c and slides up the ramp 1052 and drops into the step wall 1055 towards the second end position of 105d (FIG. 5I). When the user releases the pushing force, the sliding end of pin member 103 would slide in anticlockwise direction to avoid the step wall 1055 and refrains from going back to the second latched position 105c, the resilient member 104 urges the slider 102 out of the frame 101 and the sliding end of pin member 103 finally goes up the ramp 1050 and drops the step wall 1053 to reach the first latched position 105a (FIG. 5J). The unidirectional movement ensures equal wear and tear of the different sections of the cam track to achieve longer lifetime of this component.

Figure 6A:
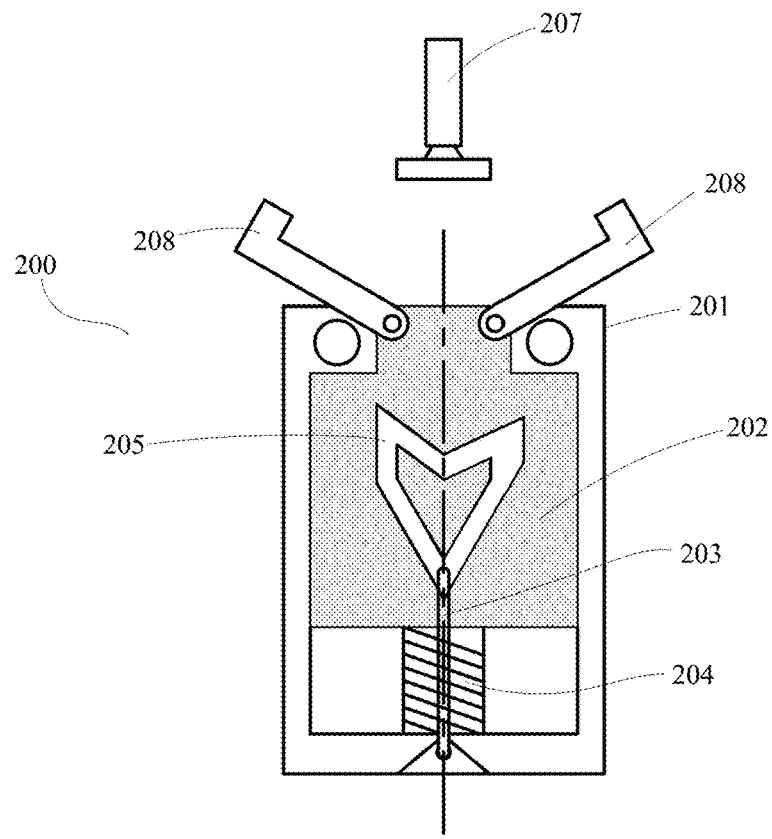
FIGS. 6A and 6B illustrate a push-push adjustment assembly useful in a LED reflector lamp constructed consistent with a second embodiment of the invention, the push-push adjustment assembly is in extended and retracted position respectively.
Figure 6B:
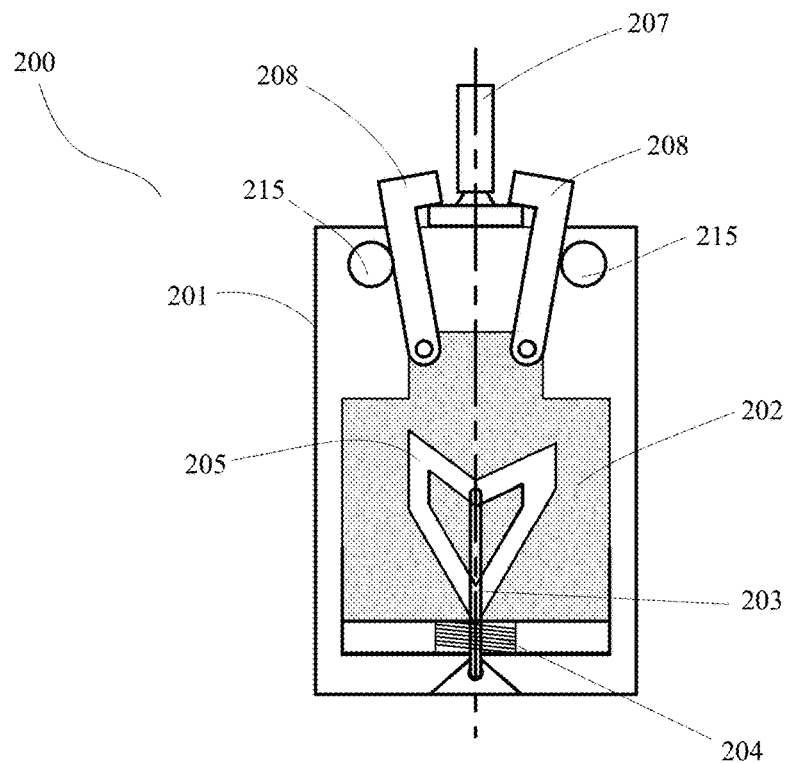

FIGS. 6A and 6B show a push-push adjustment assembly 200 constructed consistent with a second embodiment of the invention, which is a variant of the push-push adjustment assembly 100 discussed in the above first embodiment. The push-push adjustment assembly 200 of this embodiment is similar as the one shown in the first embodiment above, and comprises a frame 201 having an open end and a closed end, and a slider 202 slidably disposed in the frame 201, a pin member 203 arranged in the frame 201 wherein the pin member 203 has an anchor end anchored onto the closed end of the frame and a sliding end engaged with the cam track 205, and a resilient member 204 acting on the slider 202 to urge the slider 202 outwardly.

The push-push adjustment assembly 200 further comprises a plunger 207 arranged above the slider 202 and a pair of opposed pivotable catches 208 which are rotatably disposed on an upper part of the slider 202 to open in the extended position of the slider 202 and to close in the retracted position of the slider 202. The pivotable catches 208 may be rotatably disposed on the slider 202 to open and to close in response to relative movement of the slider 202 with respect to the frame 201. The pivotable catches 208 are able to selectively capture the plunger 207 when the plunger 207 is pressed to move down (FIG. 6B).

When the slider 202 is in the extended position wherein the pin member 203 is latched in a first latched position (FIG. 6A), the catches 208 are in the open position. When a top of the slider 202 is being pressed down by the plunger 207, the sliding end of pin member 203 slides upwards to be latched at the second latched position where the slider 202 is in the retracted position as shown in FIG. 6B, the catches 208 are constrained by two stopper pins 215 and closed automatically, grabbing a bottom end of the plunger 207 and preventing the plunger 207 from being withdrawn from the latched catches 208. Application of a downward pushing force to the plunger 207 would be able to disengage the plunger 207 from the catches 208 as the slider 202 returns into the extended position, thereby opening the catches 208 and releasing the plunger 207. In the present invention, the plunger 207 is terminated with the lens or the reflector of a reflector lamp, the reflector lamp would be able to provide two preset beam angle settings in the extended and retracted positions of the plunger 207.

Illustrated in FIGS. 6C and 6D is a variant of the push-push adjustment assembly shown in FIGS. 6A and 6B. The push-push adjustment assembly of this embodiment is structurally same as the push-push adjustment assembly 200 shown in FIGS. 6A and 6B, except for the more complicated plunger 207 which comprises a housing 210, a spring barrel 211 running through the housing 201, a coil spring 209 installed inside the spring barrel 211. The plunger 207 passes through the coil spring 209 and comprises a long upper plunger portion 207a that features a top button 207c, and a stopper 207d that rests on the top end of the coil spring 209 and is constrained by a top end of the spring barrel 211. The bottom end of the coil spring 209 compresses against the opposite end of the spring barrel 211. The plunger 207 further comprises a lower plunger portion terminated by a plunger stud 207b which protrudes outside of the spring barrel 211. When a pushing force is being applied to the plunger 207 on the button 207c, the stopper 207d compresses the coil spring 209 and thus causes to extend the plunger stud 207b towards the latch direction to activate the latching mechanism of the push-push adjustment assembly 200 until the catches 208 close and clamp the plunger stud 207b. When the pushing force is released, the coil spring 209 springs back and pulls up the plunger 207. The plunger stud 207b is then being captured tightly by the catches 208. This variant allows to provide the button 207c of the plunger 207 a longer travel distance which mainly depends on the length of the plunger 207 and the coil spring 209. It is therefore being utilized in the present invention to increase the adjustment spacing between the lens or the reflector and the light source of the reflector lamp to enhance the effect of change in the beam angle.

Figure 6E:
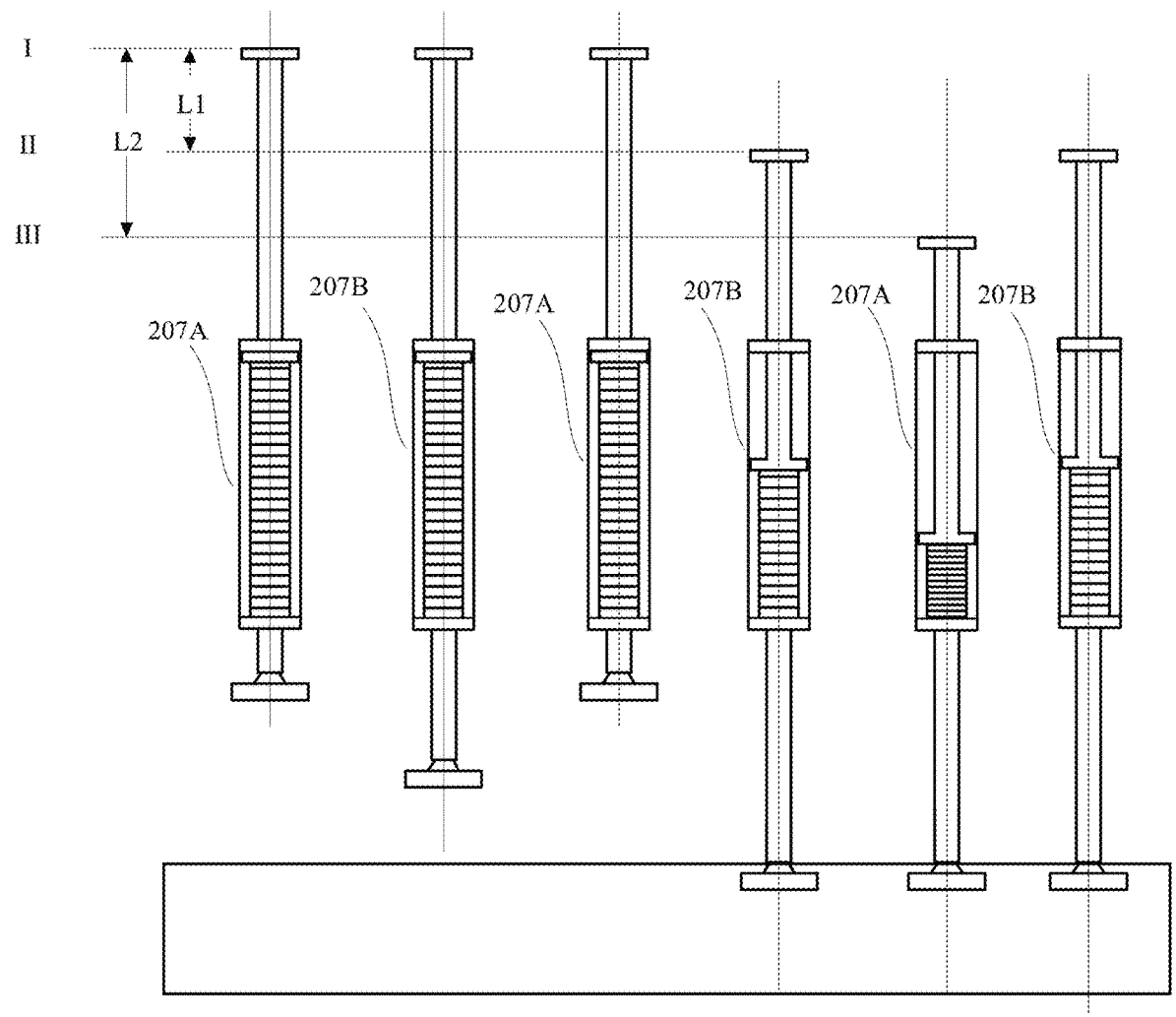
FIG. 6E illustrates another variant of the push-push adjustment assembly shown in FIGS. 6A and 6B.

Using a pair of two spring loaded plungers can achieve two different travel distances with three different latched positions for the slider 202 that is attached to the lens or reflector of the reflector lamp to provide three beam angle settings. It is illustrated in a simplified form in FIG. 6E the different combinations of extended/retracted conditions in a pair of spring loaded plungers 207A and 207B with different lengths, which have essentially the same structure as the plunger shown in FIGS. 6C and 6D. When both of the plungers 207A and 207B are in the extended position with the coil springs fully relieved, the top ends (i.e. the buttons 207c) of the two plungers 207A and 207B are at the same level I, giving the initial state of beam angle effects. When the long plunger 207B is depressed to be captured by the catches 208, a short travel distance L1 is accomplished and the plunger 207B is lowered to the level II, which in turn results in a small change of the light beam angle from its initial state. If the short plunger 207A is also depressed to be captured by the catches, such that both of the plungers 207A and 207B are being latched, a long travel distance L2 is accomplished and the short plunger 207A is lowered to the level III. In the present invention, the two plungers 207A and 207B of this push-push adjustment assembly are coupled to the lens or the reflector of a reflector lamp on the two sides of the lens or the reflector, then the lens or the reflector can be carried to the three different latched positions at three levels I, II and III to distribute the lights with three different beam angles. It would be appreciated that more than two plungers which are different in length are possible according to the invention so as to accomplish more beam angles. For example, installing four plungers of different lengths may get five different light beam angle settings.

Now turning to FIGS. 7A to 7L, a push-push adjustment assembly 300 constructed consistent with a third preferred embodiment of the present invention is being illustrated. In this embodiment, the push-push adjustment assembly 300 includes a frame defined by a front frame member 301a and a rear frame member 301b, and a slider 302 slidably disposed in the frame between the front member 310a and the rear frame member 301b. The slider 302 includes a lateral element 3022 and a lower stub 3021 extending from the lateral element 3022. The lower stub 3021 is loaded with a resilient member 304 so that the slider 302 is urged by the resilient member 304 upwardly towards the extended position. The slider 302 slides linearly with respect to the frame. The resilient member 304 may be a helical compression spring.

As shown in FIGS. 7C to 7E, a cam track 305 is defined on the front frame member 301a and retains the slider 302 to rest in the different linear resting positions of the front frame member 301a. The cam track 305 defined a closed course 306 and a stopper 307 is formed within the cam track 305. The lateral element 3022 of the slider 302 is formed with a lateral slot hole 3023 for movably constraining a trackball 303 which is able to move freely along the slot hole 3023 when an external pushing force is applied to the slider 302. The trackball may be made of plastic, steel or other materials. The trackball 303 is sized to engage the cam track 305 after it is being installed in place. The length of the slot hole 3023 may be equal to or slightly greater than the largest width of the cam track 305.

FIG. 7C illustrates that the trackball 303 rests in a first latched position 305d where the slider 302 is latched in an extended position. The slider 302 is depressed by a pushing force towards the frame, the trackball 303 would guide the slider 302 to move downward to leave the extended position to reach its retracted position. The operation of the push-push adjustment assembly 300 will be depicted with reference to FIGS. 7F to 7L.

Figures 7A, 7B:
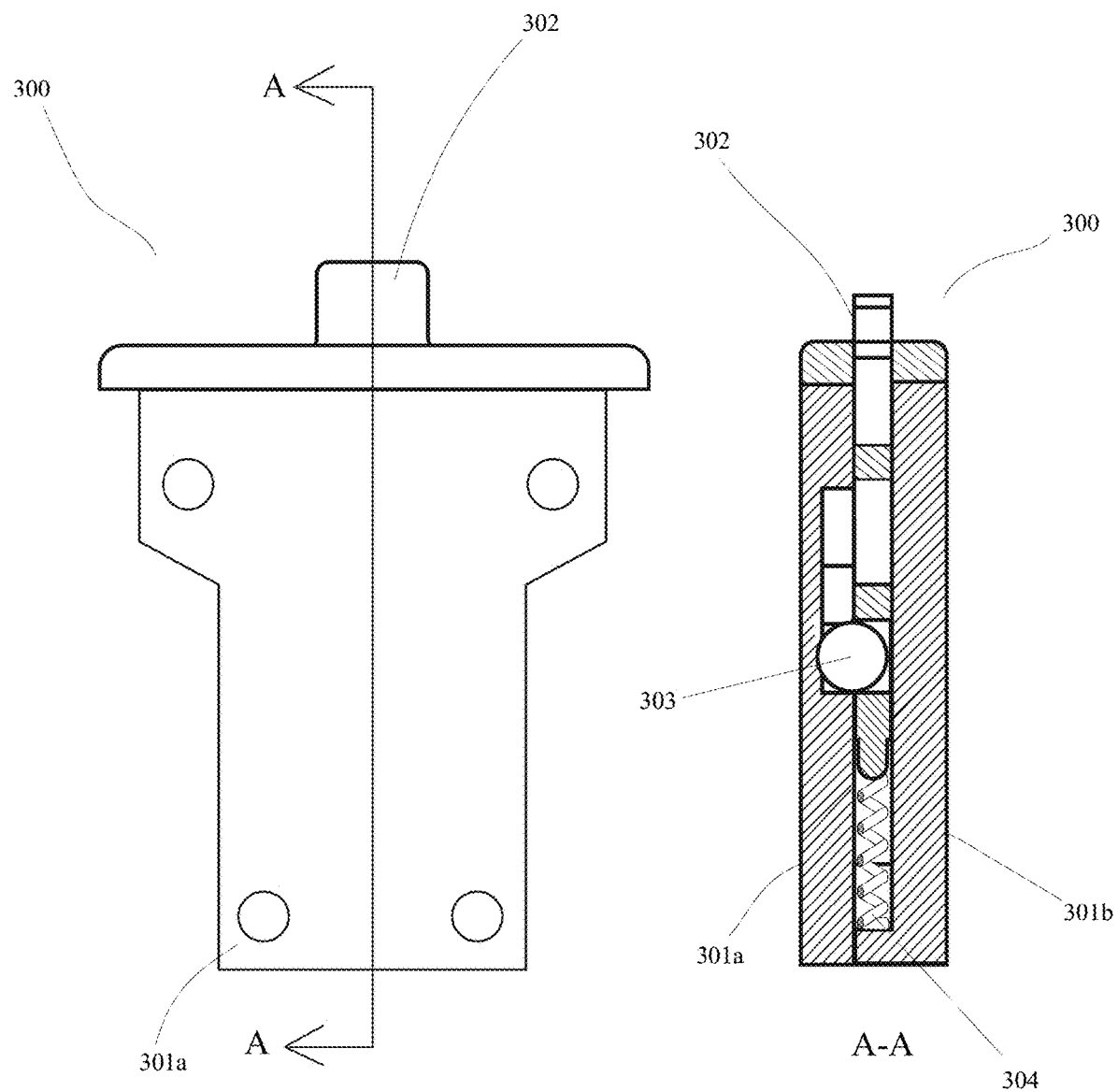
FIG. 7A is a front elevation view of a push-push adjustment assembly useful in a LED reflector lamp constructed consistent with a third embodiment of the invention.
FIG. 7B is a cross-sectional view taken along line A-A shown in FIG. 7A.
Figure 7F:
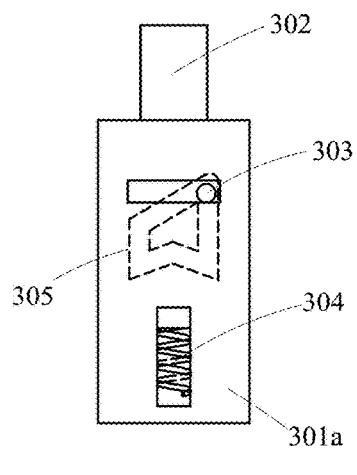
FIGS. 7F to 7L are schematic views showing the movement of the slider of the push-push adjustment assembly shown in FIGS. 7A to 7E, transitioning between the extended position and the retracted position.
Figure 7G:
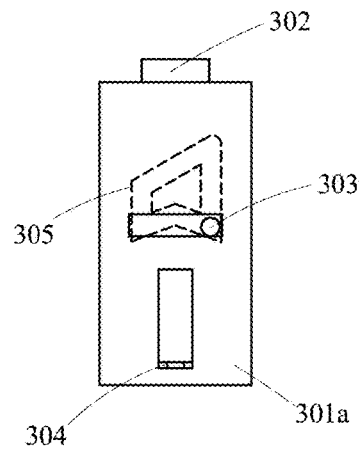
Figure 7H:
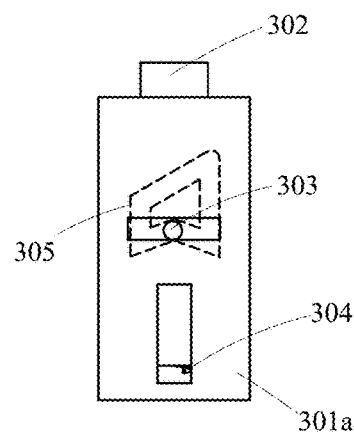
Figure 7I:
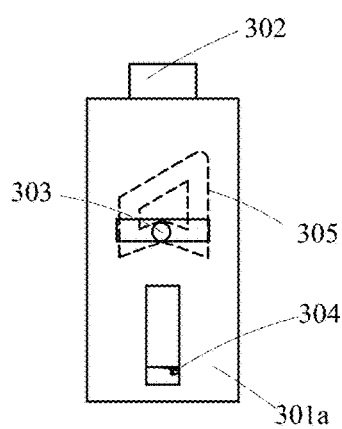

FIG. 7F shows the trackball 303 in a first latched position 305d where the slider 302 is in an extended position (also seen in FIG. 7C). When a pushing force is applied by a user on the outer end of the slider 302 to push the slider move downward, the trackball 303 guides the slider 302 leaving its first latched position 305d and travels along the cam track 305 towards the first end position 305e (FIG. 7G) and stops where the user cannot push the slider any further and the pushing force is removed. The slider 302 is then driven by reaction of the resilient member 304 to reach the second latched position 305a and stops by the stopper 307 right above the second latched position 305a (FIG. 7H). The second latched position 305a corresponds to a retracted position of the slider 302.

The slider 302 has travelled a distance which is equivalent to the distance between the first and second latched positions 305a and 305d of the trackball 303. If the slider 302 is terminated with the lens or the reflector of a reflector lamp, the reflector lamp would be able to provide two preset beam angle settings in the extended and retracted positions of the slider 302.

Figure 7J:
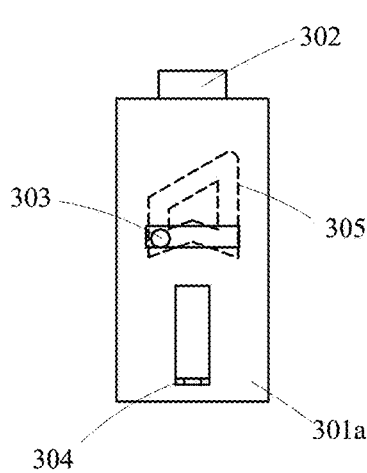
Figure 7K:
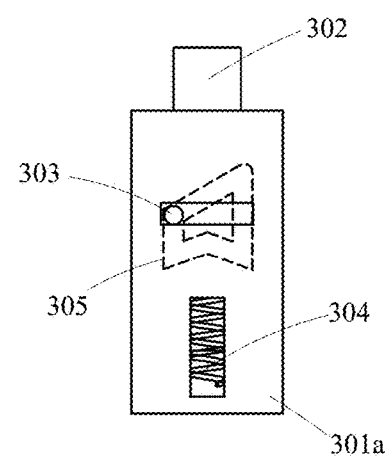
Figure 7L:
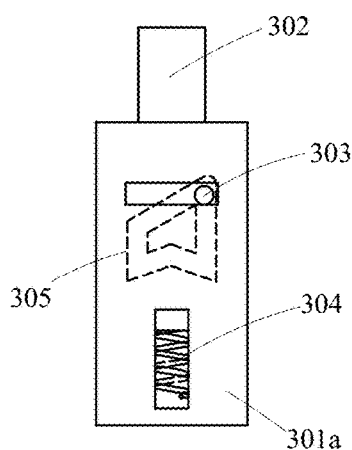

When the user wishes to reset the slider 302 from the retracted position (FIG. 7H) to the extended position (FIGS. 7F and 7L), he just needs to push the slider 302 by applying the pushing force on the slider 302 towards the frame. The cam track 305 would guide the trackball 303 to leave the second latched position 305a and stops in the second end position 305b (FIG. 7J). The user feels that the slider cannot be pushed any further and the pushing force is removed. The slider 302 would then be driven by the reaction of the resilient member 304 to move up to the position 305c (FIG. 7K) and then return to the first latched position 305d (FIG. 7L) where the slider 302 resumes to the extended position.

Similar to the cam track 105 in the first embodiment discussed above, the closed course 306 of the cam track 305 may be formed by different track sections which are different from one another in groove depth in order to guide the trackball 303 to move in an unidirectional manner. In this regard, the cam track 305 may comprise similar upward ramps followed by downward step walls, which is not elaborated here.

FIGS. 8A to 8J illustrate a push-push adjustment assembly 400 constructed consistent with a fourth preferred embodiment of the present invention. In this embodiment, the push-push adjustment assembly 400 includes a cuboidal frame 401, and a slider 402 slidably disposed in the frame 401. The slider 402 includes a lateral element 408 and a base post 407 extending from the lateral element 408. The base post is formed with a longitudinal cavity 409 there through. The base post 407 is loaded with a resilient member 404 so that the slider 402 is urged by the resilient member 404 upwardly to an extended position. The slider 402 slides linearly with respect to the frame 401. The resilient member 404 may be a helical compression spring.

Figure 8A:
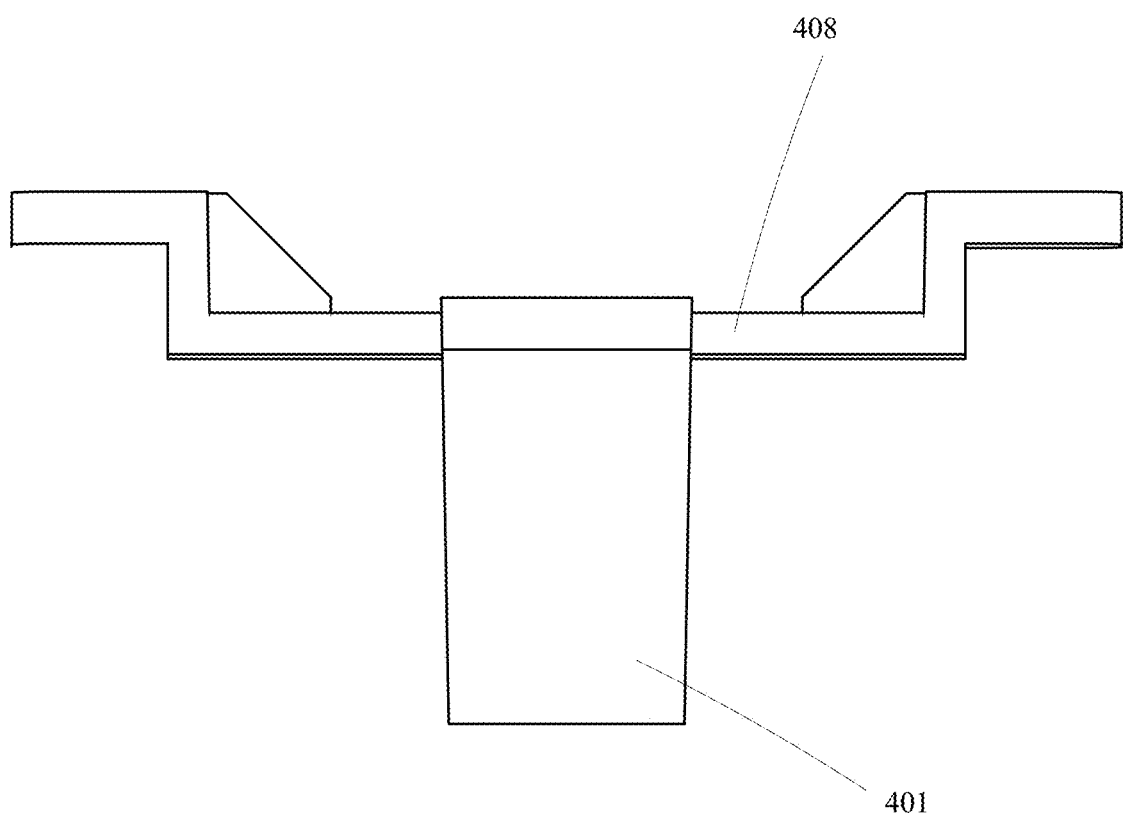
FIG. 8A is a front elevation view of a push-push adjustment assembly useful in a LED reflector lamp constructed consistent with a fourth embodiment of the invention.
Figure 8B:
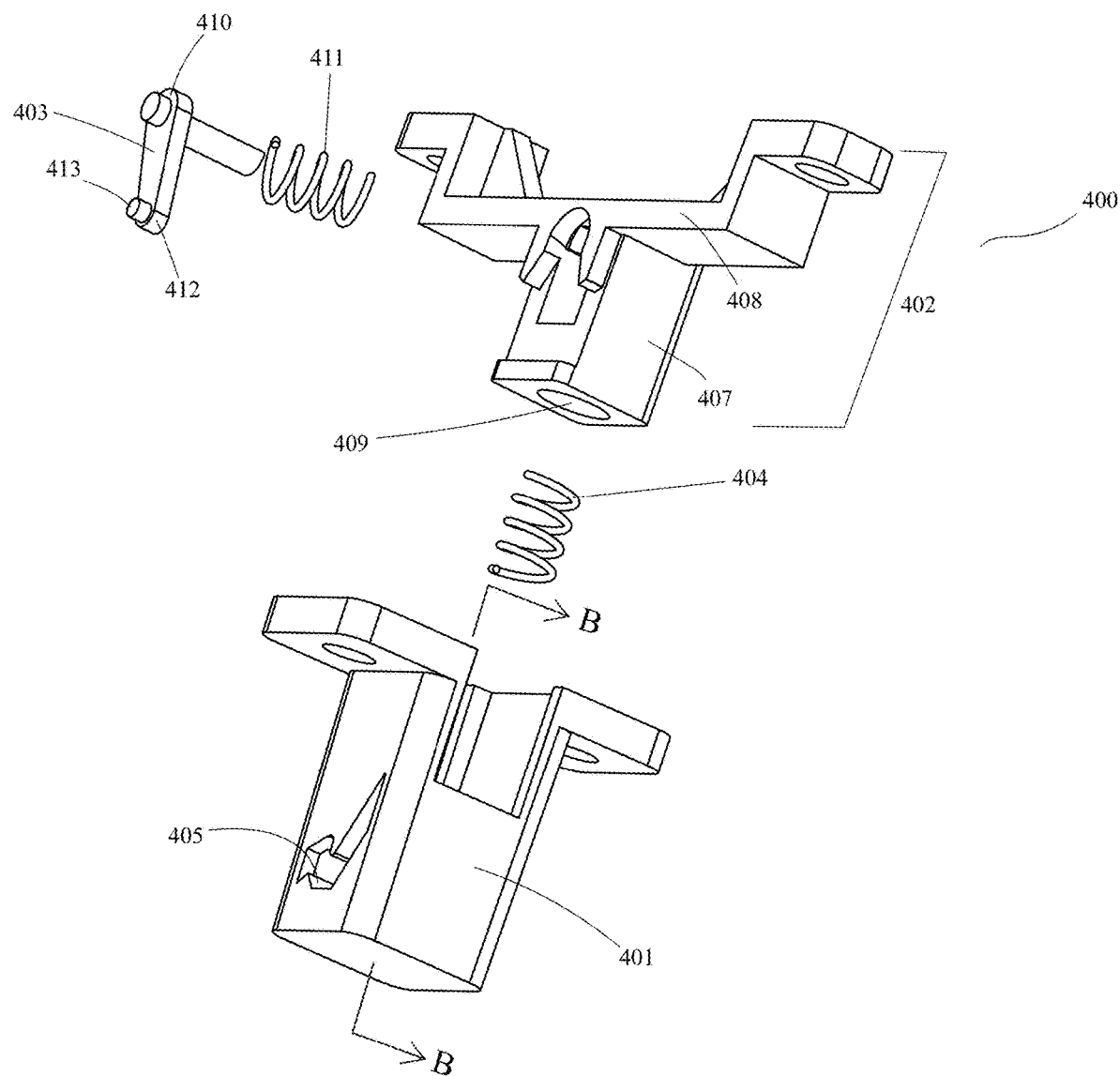
FIG. 8B is a perspective exploded view of the push-push adjustment assembly shown in FIG. 8A.
Figure 8C:
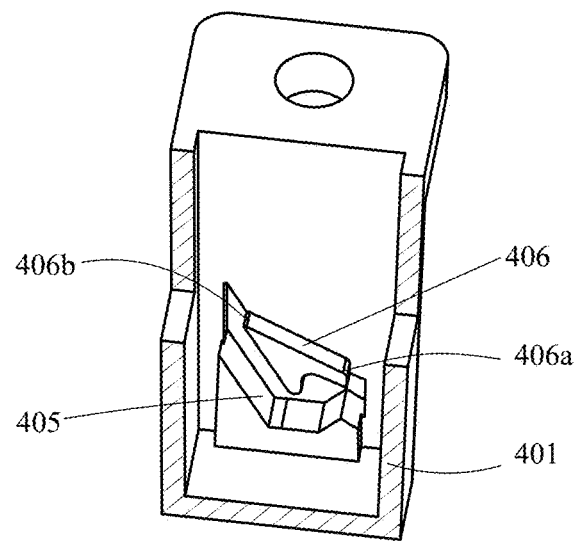
FIG. 8C is a perspective view taken along line B-B shown in FIG. 8B.

A pivotable arm 403 is pivotably mounted on the lateral element 408 of the slider 402 at its pivot end 410. The pivotable arm 403 has a free end 412 at which a latching pin 413 is mounted. The pivotable arm 403 is pivotably received in the cavity 409 of the base post 407 of the slider 402. As best shown in FIGS. 8B and 8C, a cam track 405 is defined in one vertical side of the frame 401 and retains the slider 402. A sliding ramp 406 is formed above the cam track 405, and has a lower end 406a whose end surface terminates in one end of the cam track 405 and an upper end 406b whose end surface bridges with the other end of the cam track 405. The pivot end 410 of the pivotable arm 403 is loaded with a spring 411 that exerts a biasing force such that the pivotable arm 403 has a tendency of resting on the upper end 406b of the sliding ramp 406 of the frame. The spring loaded pivot end 410 also pushes the pivotable arm 403 especially the latching pin 413 towards and against the frame above it. The pivotable arm 403 may pivot in the cavity 409 to drive the latching pin 413 to selectably engage the cam track 405 or the sliding ramp 406 to cause the slider 402 resting in response to the application or the removal of a pushing force on the lateral element of the slider 402 toward the frame.

Figures 8D, 8E:
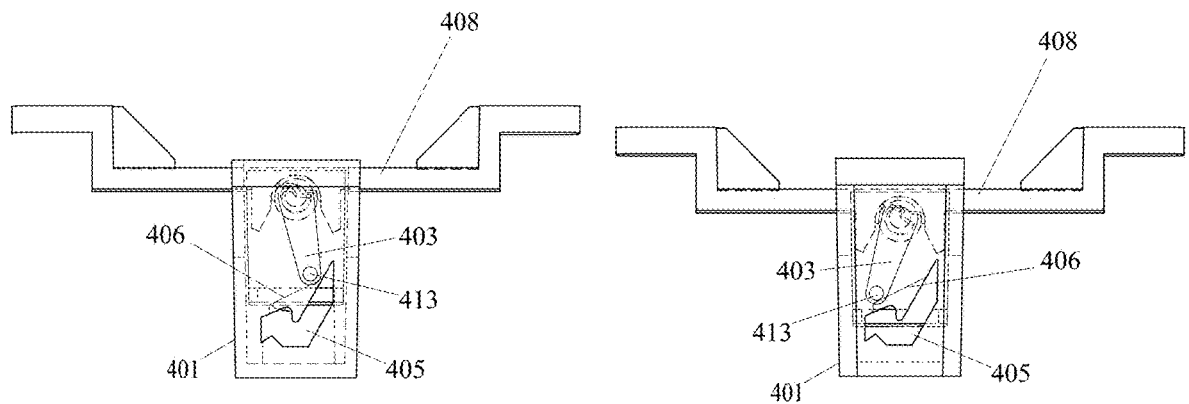
FIGS. 8D to 8J are schematic views showing the movement of the slider of the push-push adjustment assembly shown in FIGS. 8A to 8C between the extended position and the retracted position.
Figure 8F:
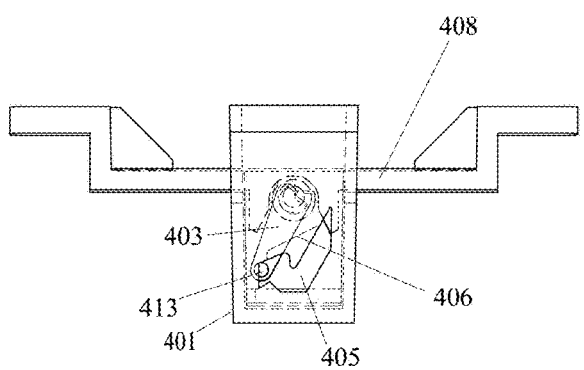
Figures 8G, 8H:
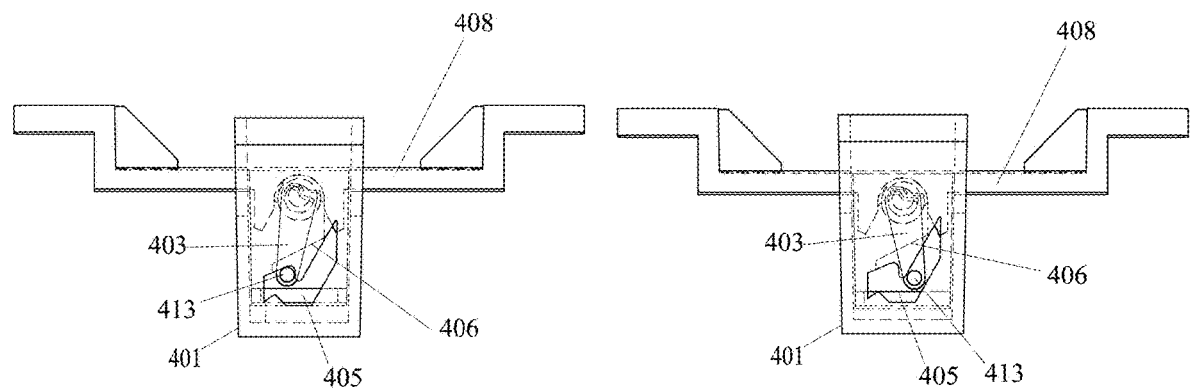
Figures 8I, 8J:
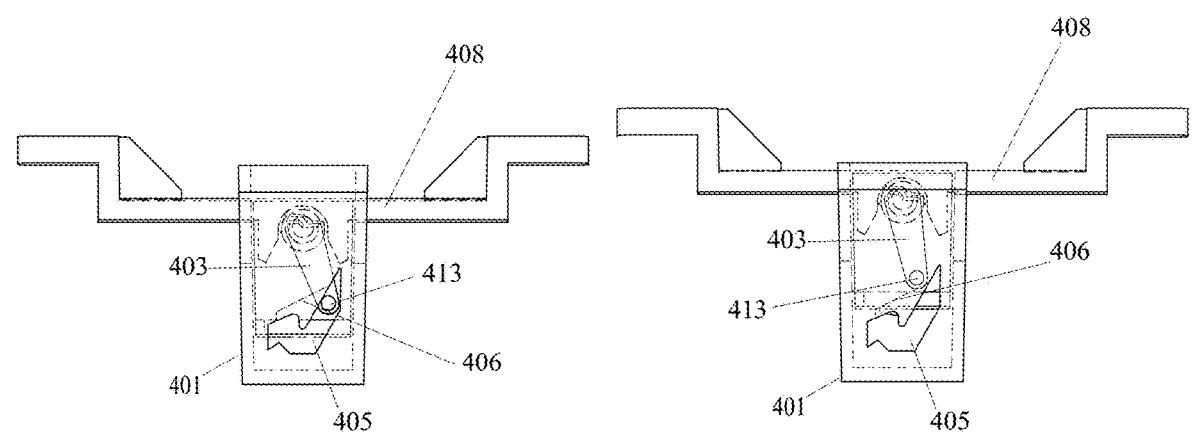

FIG. 8D illustrates that the latching pin 413 rests in a first latched position 406b where the slider 402 is latched in an extended position. The slider 402 is depressed by the pushing force, the pivotable arm 403 would pivot downward to leave the extended position to reach its retracted position (FIG. 8G). The operation of the adjustment assembly 400 will be depicted with reference to FIGS. 8D to 8J.

FIG. 8D shows the latching pin 413 is in a first latched position 406b where the slider 402 is in an extended position. When a pushing force is applied by a user on the lateral element 408 of the slider 402, the pivotable arm 403 is guided by the latching pin 413 to leave its first latched position 406b and travels along the sliding ramp 406 towards the lower end 406a of the sliding ramp 406 (FIG. 8E) which terminates in the cam track 405. Therefore, the pivotable arm 403 would drop off the lower end 406a of the sliding ramp 406 to engage with the cam track 405 and stops at a first end position of the cam track 405 (FIG. 8F) where the user cannot push the lateral element 408 any further and the pushing force is removed. The latching arm 403 is then driven by reaction of the resilient member 404 to reach the second latched position and stops because the latching pin 413 is engaged with a stopper feature on the upper wall of the cam track 405 (FIG. 8G). The second latched position corresponds to a retracted position of the slider 402.

The slider 402 travels a distance with respect to the frame 401, which distance is equivalent to the distance between the first latched position (FIG. 8D) and the second latched position (FIG. 8G) of the slider 402. If the lateral element 408 of the slider 402 is terminated with the lens or the reflector of a reflector lamp, the reflector lamp would be able to provide two preset beam angle settings in the extended and retracted positions of the slider 402 for selection by a user.

When the user wishes to reset the slider 402 from the retracted position (FIG. 8G) to the extended position (FIGS. 8D and 8J), he just needs to push the slider 402 by applying the pushing force on the lateral element 408 towards the frame. The slider 402 would be guided by the latching pin 413 of the pivotable arm 403 to leave the second latched position to travel and stops in the second end position (FIG. 8H). The user feels that the slider cannot be pushed any further and the pushing force is removed. The slider 402 would then be driven by the reaction of the resilient member 404 to move up, taking the latching pin 413 of the pivotable arm 403 along the cam track 405 and jumps to the upper end 406b of the sliding ramp 406 (FIG. 8J) because the sliding ramp bridges with the cam track 405. Therefore, the latching pin 413 returns to the first latched position 406b (FIGS. 8D and 8J) where the slider 402 resumes to the extended position.

Referring to FIGS. 9A to 13B, an exemplary LED reflector Lamp 1000 constructed in one preferred embodiment of the present invention is illustrated. The reflector lamp 1000 comprises a push-push adjustment assembly of the invention, for example the push-push adjustment assembly 400 as discussed above.

Figure 10:
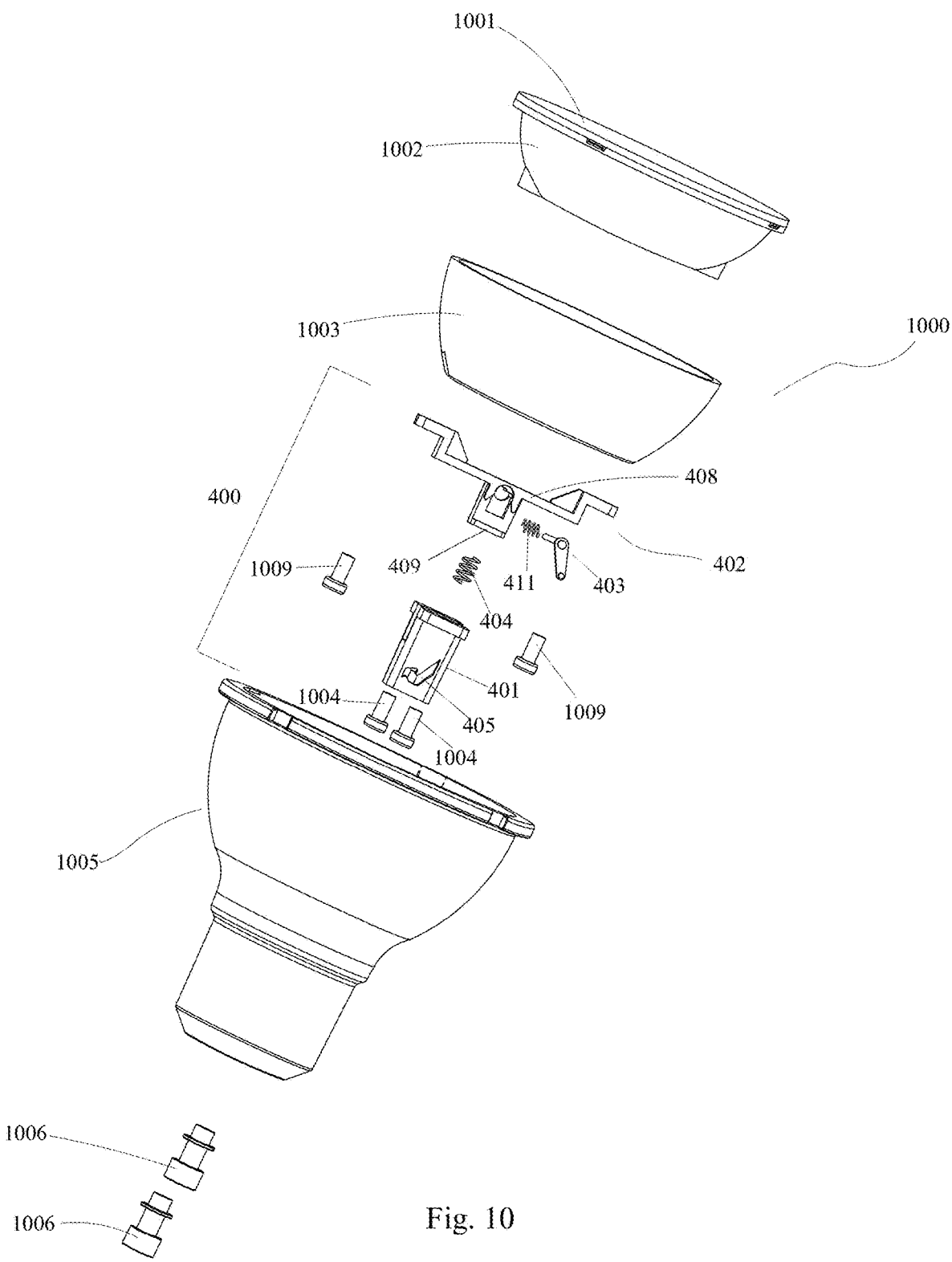
FIG. 10 is a perspective exploded view of the reflector lamp shown in FIGS. 9A and 9B.

As illustrated in FIG. 10, the LED reflector lamp 1000 comprises a lamp housing 1005, a push-push adjustment assembly 400, a heat sink 1003, a reflector cup 1002, a lens 1001 placed over a top and within the inside of the reflector cup 1002, and LED light sources (not shown) installed on the heat sink 1003 and arranged coaxially inside and at a bottom of the reflector cup 1002. It would be understood that the provision of lens 1001 and reflector cup 1002 is dependent on the design of the reflector lamp, either one of them can be removed in a simplified embodiment of this invention.

The lamp housing 1005 is usually a molded plastic part installed with two metal terminals 1006 at its bottom such that the lamp would fit a desirable lighting fixture such as common GU10 lighting fixture. Electronic driver or other electronics are usually disposed inside a lower part of the cavity of the lamp housing 1005, isolated from other metal parts such as the heat sink 1003.

The lens 1001 is generally a Total Internal Reflection (TIR) lens or Fresnel lens being used for its compactness and high optical performance. The lens 1001 is generally a molded clear transparent plastic or molded glass part to converge the light beams from the LED light source to distribute a specific illumination beam angle. The heat sink 1003 has an inner surface that receives an outer surface of the reflector cup 1002.

The bottom of the reflector cup 1002 has two holes, which are exposed by a notch 1007 formed at the bottom of the heat sink 1003 for fastening the reflector cup 1002 with the lateral element 408 of the push-push adjustment assembly 400 by means of two screws 1009 (see FIGS. 11A and 11B) such that the lens 1001 and the reflector cup 1002 are movable. Alternatively, the lateral element 408 can be attached directly to the lens 1001 through the holes formed in the reflector cup 1002 and the heat sink 1003 in order to move the lens 1001 while keeping the reflector cup 1002 stationary and attached to the heat sink 1003. The assembly of the lens 1001, the reflector cup 1002, and the adjustment assembly 400 can therefore move in a reciprocal manner inside the lamp housing 1005. The frame 401 is fixed at the back of the heat sink 1003 with two screws 1004 and remained stationary. The structures of the push-push adjustment assembly 400 may be made reference to the fourth embodiment discussed above except that the screw holes of the frame 401 in the reflector lamp 1000 are designed on the same side for fastening the frame 401 to the LED lamp 1000, unlike the frame 401 shown in FIG. 8B which has two opposite screw holes with respect to the center axis of the frame. Therefore, the push-push adjustment assembly 400 is not described in detail in terms of its structure.

Figure 9A:
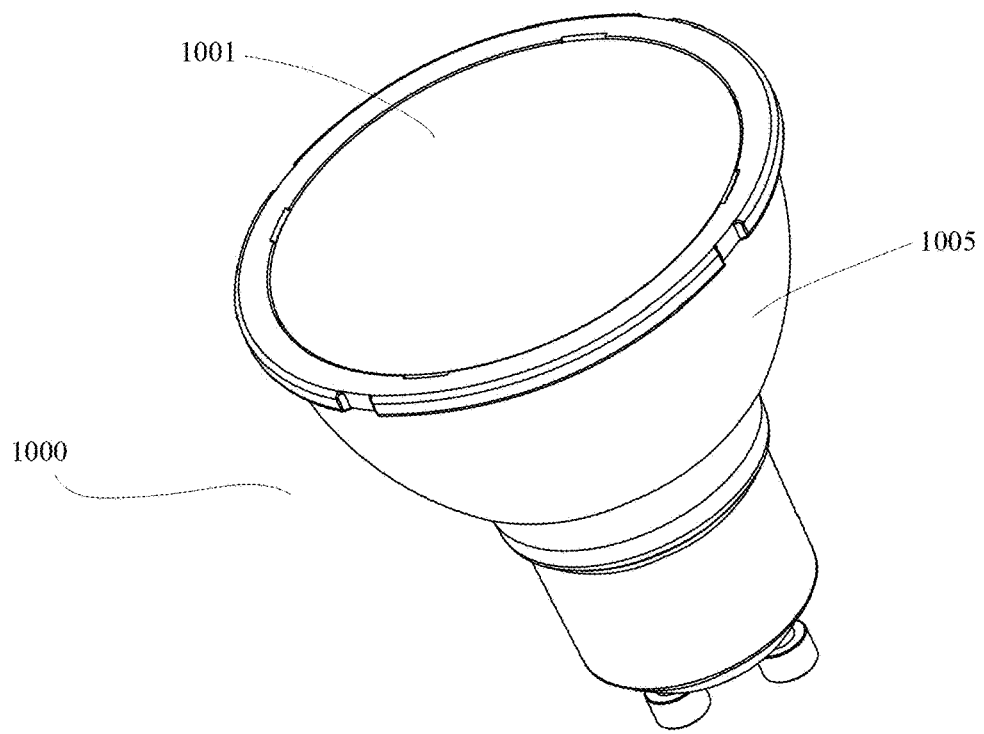
FIGS. 9A and 9B illustrate perspective views of an exemplary LED reflector Lamp constructed in one preferred embodiment of the present invention, with the lens in the extended and retracted positions respectively.
Figure 9B:
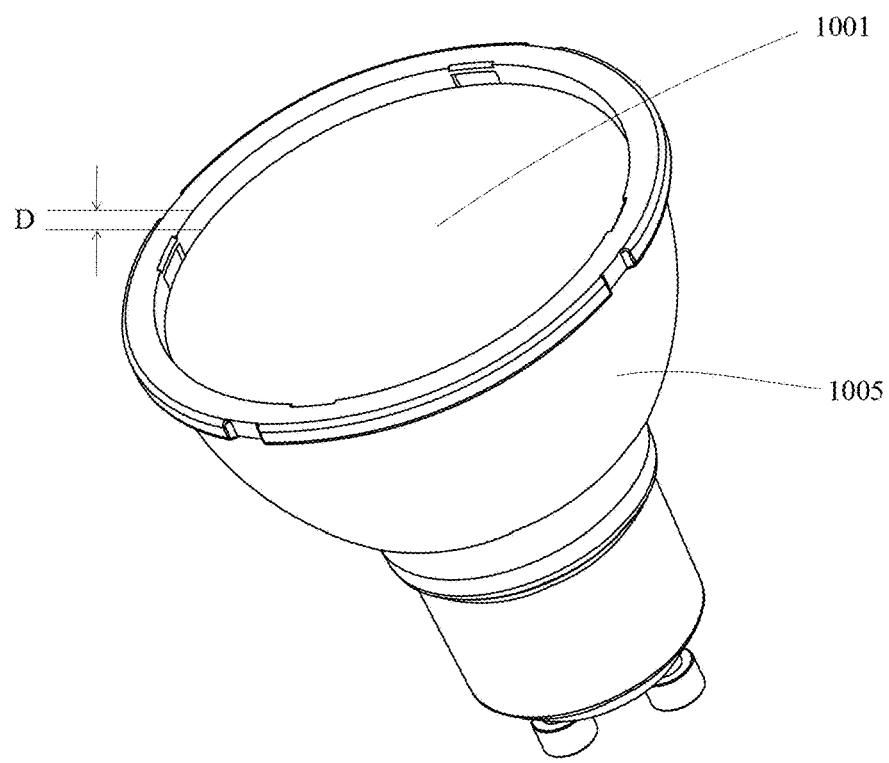

FIGS. 9A and 9B illustrate perspective views of the exemplary LED reflector Lamp 1000, with the lens 1001 observed in the extended and retracted positions respectively. The distance between the two positions is marked as "D" in FIG. 9B.

Figure 11A:
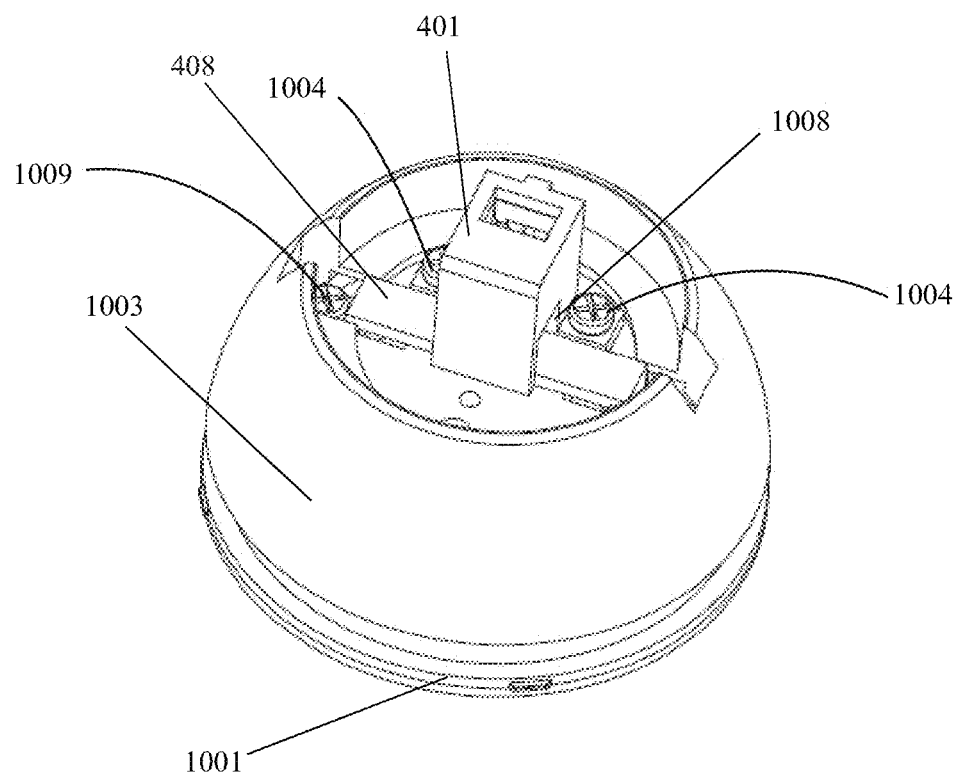
FIGS. 11A and 11B illustrate perspective bottom views of a heat sink and reflector assembly coupled with the push-push adjustment assembly in the extended and retracted positions respectively.
Figure 11B:
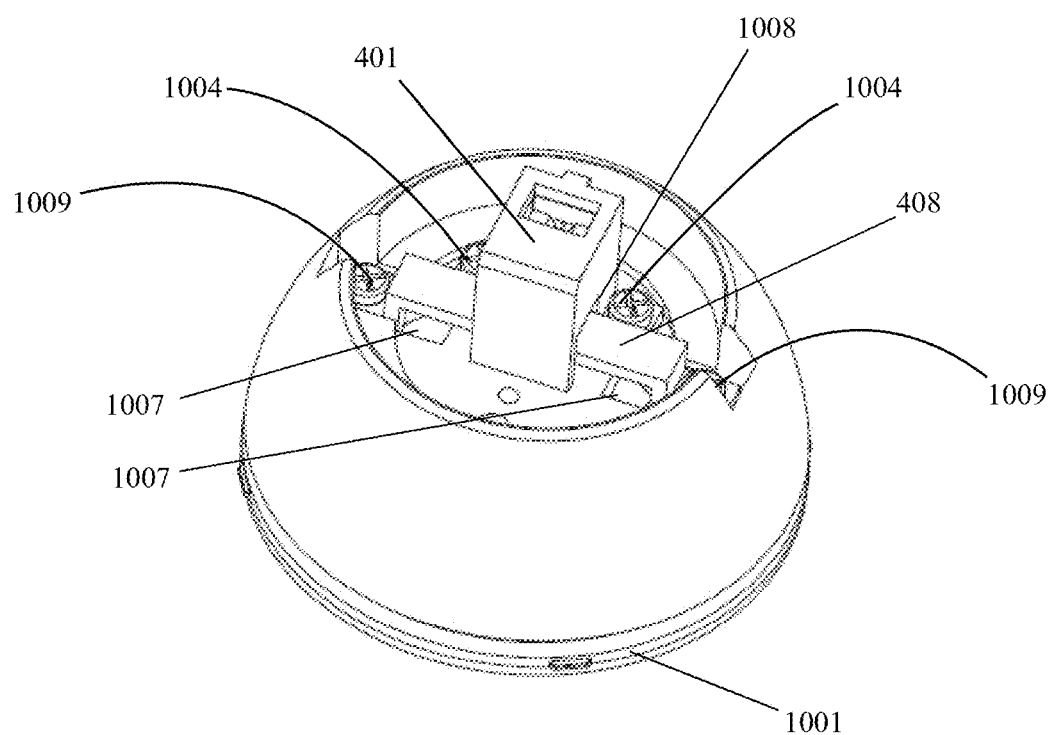

FIG. 11A further shows the lens in the extended position with a wider gap observed between the surface of the lens 1001 and the neighboring edges of the heat sink 1003. The lateral element 408 of the slider 402 is attached to the lens 1001 or the reflector cup 1002 by the mounting screws 1009. An open gap 1008 formed between the lateral element 408 and the frame 401 showing that the reflector cup 1002 and the lens 1001 is in the extended state. FIG. 11B shows the lens in the retracted state. The lateral element 408 of the slider 402 is retracted, exposing two holes 1007 inside the heat sink 1003 that allow the slider 402 to pass through, and the gap 1008 between the frame 401 and the lateral element 408 is closed.

Figure 12:
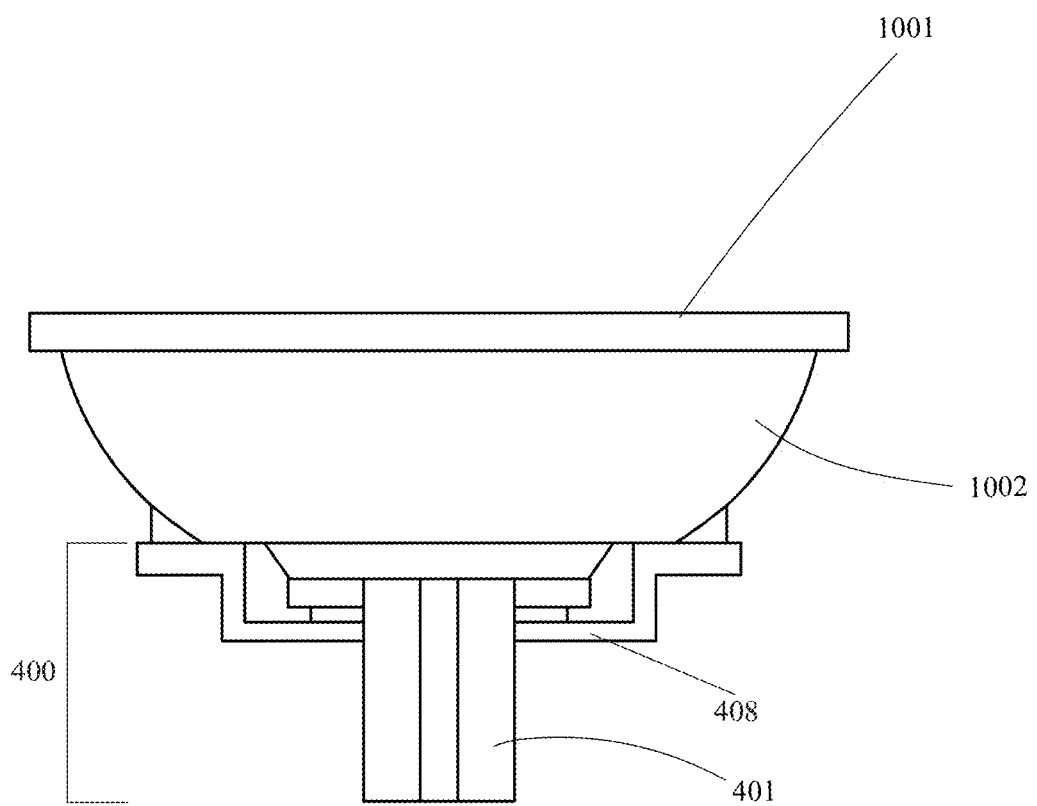
FIG. 12 is a front elevation view of the coupling of the reflector and the push-push adjustment assembly.

For the sake of simplicity, FIG. 12 shows the partial components of the reflector lamp having the lens 1001, the reflector cup 1002 and the push-push adjustment assembly 400, with other mechanical and electronic components of the reflector lamp removed.

Figure 13A:
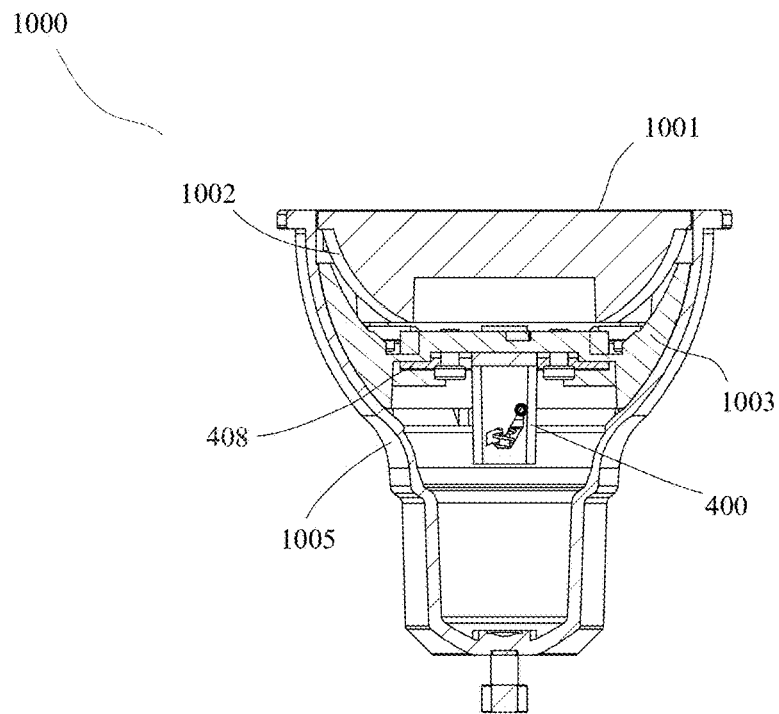
FIGS. 13A and 13B illustrate cross sectional views of the reflector lamp shown in FIGS. 9A and 9B.
Figure 13B:
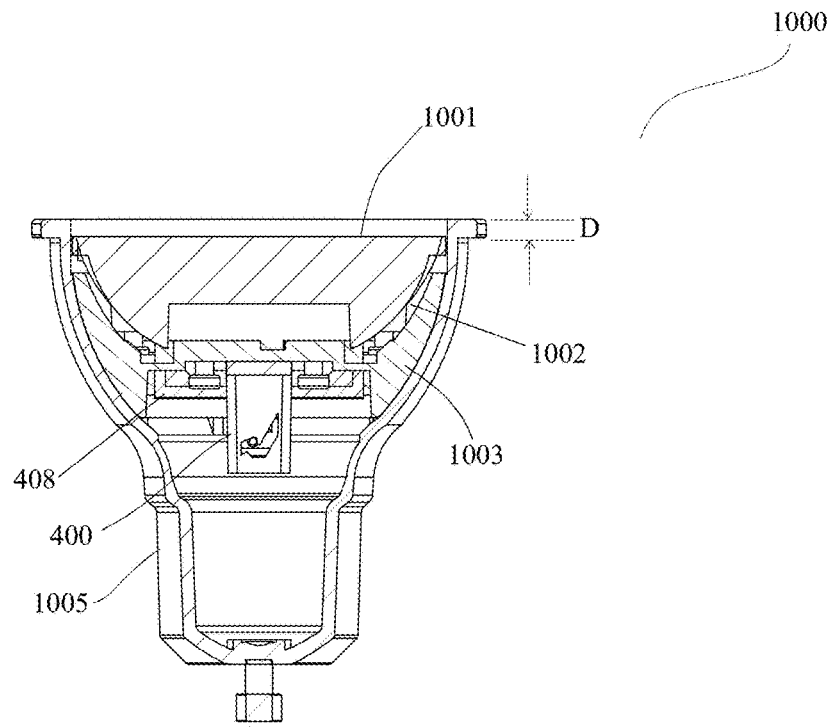

FIGS. 13A and 13B are the cross section views of the reflector lamp 1000 in the extended state (FIG. 13A) and in the retracted state (FIG. 13B). In FIG. 13A, the lens 1001 of the reflector lamp 1000 is elevated and the lateral element 408 is very close to the bottom surface of the heat sink 1003. The reflector lamp in FIG. 13B is in the retracted state. The reflector cup and lens assembly has moved downwards by a distance D as the push-push adjustment assembly 400 is in its retracted position.

The other structures of the reflector lamp 100 including driver and other electronics are not the essence of the invention and therefore not described in detail herein.

Thus, the present invention provides a reflector lamp which effectively solves the problem of adjusting the light beam angle and the lighting pattern with ease, which is accomplished by pushing the reflector cup or the lens at front of the lamp in a pushing manner or by pushing the plungers to select between more than two beam angle settings.

Having sufficiently described the nature of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

What is claimed is:

1. A reflector lamp comprising:
   a light source for generating a light beam,
   a reflector having a reflective inner surface to define a cavity, and an opening formed by an edge of the reflective inner surface, wherein the light source is disposed in the cavity, and
   a lens arranged coaxially with and being spaced apart from the light source,
   characterized in that the reflector lamp further comprises a push-push adjustment assembly for varying a beam angle of the light beam in a push manner, the push-push adjustment assembly comprising;
   a frame coupled fixedly to the lamp;
   an actuator in operative connection with the lens or the reflector, wherein the actuator movably rests in the frame so that the movement of the actuator enables the lens or the reflector to slide relative to the light source thereby to provide variable axial spacing between the lens or the reflector and the light source; and
   a push-push latch mechanism coupled to the actuator and/or the frame to move and to latch the actuator in the frame.

2. A reflector lamp according to claim 1, wherein the push-push adjustment assembly is provided as a cam track and latch pin assembly, comprising;
   the frame,
   the actuator configured as a slider slidably disposed in the frame wherein a cam track defined in the slider,
   the push-push latch mechanism configured as a pin member, wherein the pin member has a first end connected to the frame and a second end selectably engageable with the cam track in the slider to cause the slider to alternate among a plurality of resting positions in the frame in response to alternating application and removal of a pushing force on the slider, and
   a resilient member acting on the slider to urge the slider in a direction opposite to the pushing force.

3. A reflector lamp according to claim 2, wherein the slider is fully disposed in the frame and the cam track and latch pin assembly further comprises:
   at least one plunger arranged above the slider,
   at least one pair of opposed pivotable catches in a number corresponding to the number of plunger, wherein the pair of the pivotable catches are rotatably disposed on the slider to close to capture the plunger and to open to release the plunger in response to alternating application and removal of a pushing force on the plunger.

4. A reflector lamp according to claim 3, wherein each plunger comprises a housing fixed on the lamp, a spring barrel mounted on the housing, and a spring member received in the spring barrel, wherein the plunger passes through the spring member and comprises an upper plunger portion having a top button and a stopper resting on a top end of the spring member wherein the stopper is constrained by a top end of the spring barrel; and a lower plunger stud protruding beyond the spring barrel, wherein the plunger stud is capturable by the catch pair.

5. A reflector lamp according to claim 3, wherein the cam track comprises a closed course defined by a plurality of track sections having a plurality of differences in groove depth in order to guide movement of the pin member in the closed course in accordance with a predetermined unidirectional path.

6. A reflector lamp according to claim 3, wherein the pin member has a sliding end which is movable and guided in the closed course to be latched in a plurality of locked positions, so that the plurality of locked positions are respectively correspondent to the plurality of resting positions of the slider in the frame.

7. A reflector lamp according to claim 6, wherein the cam track is designed such that the sliding end of the pin member is movable to be latched in a first latch position where the slider is in an extended position and in a second latched position where the slider is in a retracted position.

8. A reflector lamp according to claim 3, wherein the cam track is designed such that the pin member is movable to be latched in a first latch position where the slider is in an extended position and in a second latched position where the slider is in a retracted position, and wherein the cam track and latch pin assembly comprises two or more plungers which are different in plunger length, and a corresponding number of the catch pairs, each of the catch pairs is positioned to capture a respective one of the plungers when the slider is in the retracted position, thereby to vary the axial spacing between the lens or the reflector coupled to the plungers, and the light source.

9. A reflector lamp according to claim 2, wherein the cam track comprises a closed course defined by a plurality of track sections having a plurality of differences in groove depth in order to guide movement of the pin member in the closed course in accordance with a predetermined unidirectional path.

10. A reflector lamp according to claim 2, wherein the pin member has a sliding end which is movable and guided in the closed course to be latched in a plurality of locked positions, so that the plurality of locked positions are respectively correspondent to the plurality of resting positions of the slider in the frame.

11. A reflector lamp according to claim 10, wherein the cam track is designed such that the sliding end of the pin member is movable to be latched in a first latch position where the slider is in an extended position and in a second latched position where the slider is in a retracted position.

12. A reflector lamp according to claim 2, wherein the frame of the push-push adjustment assembly is fastened to a bottom of the reflector or to a part of a heat sink or a casing of the reflector lamp.

13. A reflector lamp according to claim 1, wherein the push-push adjustment assembly is provided as a cam track and latch trackball assembly, comprising;
the frame having an inner surface, wherein a cam track is defined on the inner surface of the frame,
the actuator configured as a slider slidably disposed in the frame, the slider comprising a lateral element and a stub extending downward from the lateral element, wherein a lateral slot hole is defined on the lateral element,
the push-push latch mechanism configured as a trackball, wherein the trackball is movably constrained by the lateral slot hole of the slider and moves to selectably engage the cam track in the frame to cause the slider to alternate among a plurality of resting positions in the frame in response to alternating application and removal of a pushing force on the lateral element of the slider, and
a resilient member acting on the stub of the slider to urge the slider in a direction opposite to the pushing force.

14. A reflector lamp according to claim 13, wherein the cam track comprises a closed course defined by a plurality of track sections having a plurality of differences in groove depth in order to guide movement of the trackball in the closed course in accordance with a predetermined unidirectional path.

15. A reflector lamp according to claim 14, wherein the trackball received in the lateral slot hole is movable in the closed course to be latched in a plurality of locked positions, so that the plurality of locked positions are respectively correspondent to the plurality of resting positions of the slider in the frame.

16. A reflector lamp according to claim 15, wherein the cam track is designed such that the trackball is movable to be latched in a first latch position where the slider is in an extended position and in a second latched position where the slider is in a retracted position.

17. A reflector lamp according to claim 13, wherein the frame of the push-push adjustment assembly is fastened to a bottom of the reflector or to a part of a heat sink or a casing of the reflector lamp.

18. A reflector lamp according to claim 1, wherein the push-push adjustment assembly is provided as a cam track and pivotable arm assembly, comprising;
the frame, wherein a cam track is defined in the frame and a sliding ramp is formed above the cam track, the sliding ramp having a lower end whose end surface terminates in the cam track and an upper end whose end surfaces bridges with the cam track,
the actuator configured as a slider slidably disposed in the frame, the slider comprising a lateral element and a base post extending downward from the lateral element, wherein a longitudinal cavity is defined in the base post,
the push-push latch mechanism configured as a pivotable arm having a pivot end pivotably mounted on the lateral element and a free end at which a latching pin is mounted, wherein the pivot end is loaded with a spring member that exerts a biasing force such that the pivotable arm has a tendency of resting on the upper end of the sliding ramp pressing against the frame, and the pivotable arm is pivotably received in the cavity of the base post and pivots to selectably engage the cam track in the frame to cause the slider to alternate among a plurality of resting positions in the frame in response to alternating application and removal of a pushing force on the lateral element of the slider, and
a resilient member acting on the base post of the slider to urge the slider in a direction opposite to the pushing force.

19. A reflector lamp according to claim 18, wherein the latching pin at the free end of the pivotable arm slides along the sliding ramp of the frame to drop and engage the cam track and moves in the cam track to cause the pivotable arm and the slider to be latched in a plurality of locked positions, which respectively correspond to the plurality of resting positions of the slider in the frame.

20. A reflector lamp according to claim 19, wherein the cam track is designed such that the latching pin of the pivotable arm is movable in the cam track to be latched in a first latch position where the slider is in a retracted position and movable to be latched in the upper end of the sliding ramp where the slider is in an extended position.

21. A reflector lamp according to claim 18, wherein the frame of the push-push adjustment assembly is fastened to a bottom of the reflector or to a part of a heat sink or a casing of the reflector lamp.

22. A reflector lamp according to claim 1, wherein the frame of the push-push adjustment assembly is fastened to a bottom of the reflector or to a part of a heat sink or a casing of the reflector lamp.

* * * * *